United States Patent [19]
Stockinger et al.

[11] Patent Number: 5,807,927
[45] Date of Patent: Sep. 15, 1998

[54] CROSSLINKED POLYMERS CONTAINING URETHANE GROUPS

[75] Inventors: Friedrich Stockinger, Courtepin; Beat Müller, Marly, both of Switzerland

[73] Assignee: CIBA Vision Corporation, Duluth, Ga.

[21] Appl. No.: 875,339

[22] PCT Filed: Jan. 22, 1996

[86] PCT No.: PCT/EP96/00243

§ 371 Date: Oct. 6, 1997

§ 102(e) Date: Oct. 6, 1997

[87] PCT Pub. No.: WO96/24073

PCT Pub. Date: Aug. 8, 1996

[30] Foreign Application Priority Data

Feb. 3, 1995 [CH] Switzerland ............... 315/95

[51] Int. Cl.$^6$ ...................................................... C08F 8/14
[52] U.S. Cl. ................ 525/58; 525/59; 525/60; 525/61
[58] Field of Search ................ 525/58, 59, 60, 525/61

[56] References Cited

U.S. PATENT DOCUMENTS

| | | | |
|---|---|---|---|
| 2,606,892 | 8/1952 | Kropa et al. | |
| 4,347,198 | 8/1982 | Ohkada | 264/2.3 |
| 4,665,123 | 5/1987 | Goldenberg | 525/61 |
| 4,670,506 | 6/1987 | Goldenberg et al. | 525/59 |
| 4,978,713 | 12/1990 | Goldenberg | 525/61 |
| 5,508,317 | 4/1996 | Muller | 522/85 |
| 5,583,163 | 12/1996 | Muller | 525/61 |

FOREIGN PATENT DOCUMENTS

| | | |
|---|---|---|
| 0201693A2 | 3/1986 | European Pat. Off. . |
| 0216074A2 | 7/1986 | European Pat. Off. . |
| 0321403A2 | 12/1988 | European Pat. Off. . |
| 0534307A2 | 9/1992 | European Pat. Off. . |

*Primary Examiner*—Bernard Lipman
*Attorney, Agent, or Firm*—Michael U. Lee; R. Scott Meece

[57] ABSTRACT

A process for the production of mouldings, in particular contact lenses, in which a water-soluble, crosslinkable polymer is crosslinked in solution, and mouldings, in particular contact lenses, obtainable by this process; and novel water-soluble, crosslinkable polymers which can be employed in the crosslinking process, in particular those based on polyvinyl alcohol having a molecular weight of at least about 2000 which comprises units of the formulae: XI and XII, XI and XIII or XI, XII and XIII. In said Formulae, U is (a) or —Y—NH—CO—O—Z—O—CH=CH$_2$ group, and a unit of the formula XII and a unit of the formula XIII as defined in the description, and crosslinked polymers, either homopolymers or copolymers, made from these novel water-soluble, crosslinkable polymers, a process for the preparation of the novel water-soluble, crosslinkable polymers and the homopolymers and copolymers obtainable therefrom, mouldings made from said homopolymers or copolymers, in particular contact lenses made from these homopolymers or copolymers, and a process for the production of contact lenses using said homopolymers or copolymers.

43 Claims, No Drawings

CROSSLINKED POLYMERS CONTAINING URETHANE GROUPS

The invention relates to a novel process for the production of mouldings, in particular contact lenses, in which a novel crosslinkable polymer comprising units containing a crosslinkable group and at least one further modifier is crosslinked in solution, and to mouldings, in particular contact lenses, which are obtainable by this process.

The present invention also relates to novel polymers based on polyvinyl alcohol which contain cyclic acetal or ketal groups, and to novel crosslinkable polymers which can be employed in the novel process, in particular those based on starting polymers containing functional groups, for example hydroxyl groups, on the polymer chain or functional groups, for example imino groups, in the polymer chain or functional groups bonded to the polymer skeleton via a bridge, where these functional groups allow covalent bonds to compounds containing a crosslinkable modifier group or another modifier group. These starting polymers are, in particular, polyhydroxyl compounds having a 1,2- and/or 1,3-diol structure, such as polyvinyl alcohol, or hydrolysed copolymers of vinyl acetate, for example copolymers with vinyl chloride, N-vinylpyrrolidone, etc.

The invention furthermore relates to crosslinked polymers, either homopolymers or copolymers, made from these novel crosslinkable polymers which contain a crosslinkable group and at least one further modifier, to a process for the preparation of these novel crosslinkable polymers and the homopolymers and copolymers obtainable therefrom, to mouldings made from said homopolymers or copolymers, in particular contact lenses made from these homopolymers or copolymers, and to a process for the production of contact lenses using the said homopolymers or copolymers.

Contact lenses based on polyvinyl alcohol have already been disclosed. For example, EP 216 074 discloses contact lenses comprising polyvinyl alcohol containing (meth) acryloyl groups bonded via urethane groups. EP 189 375 describes contact lenses comprising polyvinyl alcohol crosslinked by means of polyepoxides.

Furthermore, some specific acetals containing crosslinkable groups have also already been disclosed. In this connection, we refer, for example, to EP 201 693, EP 215 245 and EP 211 432. EP 201 693 describes, inter alia, acetals of unbranched aldehydes having 2 to 11 carbon atoms carrying a terminal amino group which is substituted by a $C_3$–$C_{24}$ olefinically unsaturated organic radical. This organic radical contains a functionality which withdraws electrons from the nitrogen atom, and furthermore the olefinically unsaturated functionality is polymerizable. EP 201 693 also claims products of the reaction of the acetals characterized above with a 1,2-diol, a 1,3-diol, a polyvinyl alcohol or a cellulose. However, such products are not described directly.

If one of the acetals of EP 201 693 is mentioned at all in connection with, for example, polyvinyl alcohol, as is the case, inter alia, in Example 17 of that patent application, the acetal which can be polymerized via its olefinic group is first copolymerized with, for example, vinyl acetate. The resultant copolymer is then reacted with polyvinyl alcohol, and an emulsion having a solids content of 37%, a pH of 5.43 and a viscosity of 11,640 cps is obtained.

However, these references do not reveal the novel combination of a crosslinkable urethane structure with a second modifier having an acetal or urethane structure.

By contrast, the present invention relates, inter alia, in particular to polymers having, inter alia, a 1,2- and/or 1,3-diol skeleton, in which a certain percentage of the 1,3-diol units has been modified to give a 1,3-dioxane and to give a urethane group, or in which a certain percentage of the 1,3-diol units has been modified to give two different urethane groups, where at least one group bonded via urethane contains a crosslinkable radical. The crosslinkable radical is, in particular, an acrylate or vinyl ether radical. The present invention likewise relates to crosslinked homopolymers and copolymers of said crosslinkable polymers, to a process for the preparation of novel crosslinkable polymers and the homopolymers and copolymers obtainable therefrom, to mouldings made from said homopolymers or copolymers, in particular contact lenses made from these homopolymers or copolymers, and to a process for the preparation of contact lenses using the said homopolymers or copolymers.

The novel crosslinkable polymer comprising a crosslinkable group and at least one further modifier is preferably a derivative of a polyvinyl alcohol having a mean molecular weight of at least about 2000 which comprises from about 0.5 to about 80%, based on the number of hydroxyl groups in the polyvinyl alcohol, of units of the formula XI

and at least one further modifier comprising units of the formula formula XII

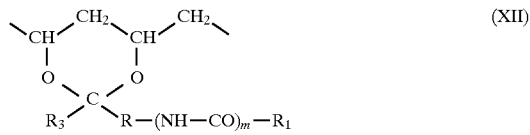

or units of the formula XIII

in which

U is an

or —Y—NH—CO—O—Z—O—CH=$CH_2$ group,

X is a bridge having 2 to 12 carbon atoms, $R_2$ is hydrogen or a $C_1$–$C_4$alkyl group, Y is a bridge having 7 to 12 carbon atoms, Z is a $C_2$–$C_{12}$alkylene bridge, which may be interrupted once or more than once by an oxygen atom, $R_3$ is hydrogen, a $C_1$–$C_6$alkyl group or a cycloalkyl group, R is a $C_1$–$C_{12}$alkylene bridge, $R_1$ is an organic group having 1 to 18 carbon atoms, A is an organic radical having 1 to 18 carbon atoms, and m is 0 or 1.

The novel crosslinkable polymer comprising a crosslinkable group and at least one further modifier is, in particular, a derivative of a polyvinyl alcohol having a molecular weight of at least about 2000 which comprises from about 0.5 to about 80%, based on the number of hydroxyl groups in the polyvinyl alcohol, of units, in particular, of the formula V

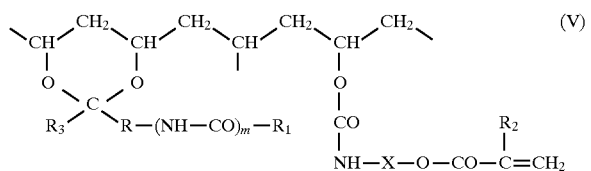

or of the formula VII

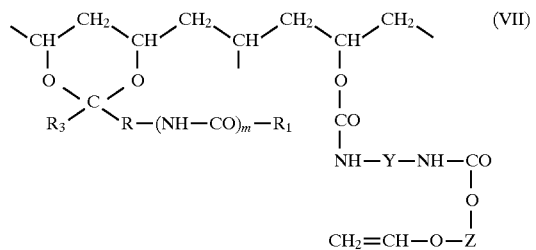

or of the formula IX

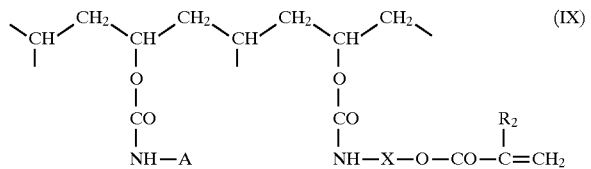

or of the formula X

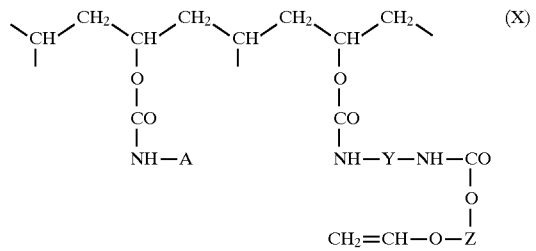

in which the symbols $R_3$, R, m, $R_1$, X, $R_2$, Y, Z and A are as defined above.

In the units of the formula V, VII, IX and X, the separation between two OH groups which have been derivatized by means of a modifier group is not crucial and is not defined by the separation given specifically in the formulae. The essential feature of said formulae is that a polyvinyl alcohol contains two different modifiers, as stated, without their position, number, sequence or separation being defined.

The polymer-bonded crosslinkable group and the further modifier are covalently bonded to the polymeric support by an irreversible bond. The further modifier serves, inter alia, for weighting, which, for example, improves the mechanical properties and increases the water content of the crosslinkable polymers.

If X is a bridge having 2 to 12 carbon atoms, it is, in particular, an aliphatic, cycloaliphatic or aromatic bridge. Aliphatic bridges which may be mentioned in this connection are, in particular, alkylene, for example ethylene, propylene, n-1-butylene, 2-butylene, n-amylene, 1-hexylene, 1-heptylene, 1-octylene, 4-ethyl-2-hexylene, 1-nonylene, 2-methylenepentane or 4-ethen-4-ylheptane. If X is a cycloaliphatic bridge, it is, in particular, cyclohexylene or cyclohexylene (lower alkylene), for example cyclohexylenemethylene, which is unsubstituted or is substituted by 1 to 4 methyl groups, for example trimethylcyclohexylenemethylene; if X is an aromatic bridge, it is, in particular, phenylene, unsubstituted or substituted by lower alkylene or lower alkoxy, for example the phenylenemethylene or methylenephenylene group; further, it can also be a phenylenephenylene group.

X is preferably an aliphatic bridge, in particular $C_1$–$C_6$alkylene, especially —$CH_2$—$CH_2$—.

$C_1$–$C_4$Alkyl $R_2$ is a linear or branched alkyl group, such as the methyl, ethyl, n-propyl, isopropyl, n-butyl, isobutyl or tert-butyl group.

$R_2$ is preferably hydrogen or methyl.

If Y is a bridge having 7 to 12 carbon atoms, it is an aliphatic, cycloaliphatic or aromatic bridge. Aliphatic bridges Y are, for example, alkylene, for example 1-heptylene, 1-octylene or 1-nonylene. If Y is a cycloaliphatic bridge, it is, in particular, cycloalkylene-$C_1$–$C_4$alkylene, unsubstituted or substituted by $C_1$–$C_4$alkyl, in particular the bridge of the formula

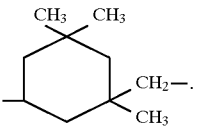

If Y is an aromatic bridge, it is, in particular, phenylene, unsubstituted or substituted by $C_1$–$C_4$alkyl, in particular the bridge of the formula

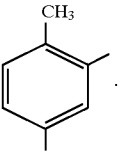

Z as a $C_2$–$C_{12}$alkylene bridge which may also be interrupted by an oxygen atom is, in particular, an ethylene, propylene, n-1-butylene, n-2-butylene, n-amylene, 1-hexylene, 1-heptylene, 1-octylene or 1-nonylene bridge. It is preferably a $C_2$–$C_4$alkylene bridge, in particular an ethylene bridge.

$R_3$ as a $C_1$–$C_6$alkyl group is a linear or branched alkyl group which is unsubstituted or substituted, for example, by OH or halogen (Cl, Br, F or I). It is, for example, a methyl, ethyl, n- or isopropyl group.

In the preferred units and crosslinkable polymers, $R_3$ is hydrogen, in which case the acetal group is involved, or $R_3$ is methyl or ethyl, in which case a ketal group is involved.

R as a $C_1$–$C_{12}$alkylene bridge is linear or branched, for example methylene, ethylene, propylene, n-1-butylene, 2-butylene, n-amylene, 1-hexylene, 1-heptylene, 1-octylene, 4-ethyl-2-hexylene, 1-nonylene, 2-methylenepentane or 4-ethen-4-ylheptane.

In the preferred polymers, R is, in particular, a linear $C_1$–$C_5$alkylene bridge, especially a $C_1$–$C_3$alkylene bridge, such as methylene, ethylene or n-propylene.

$R_1$ as an organic group having 1 to 18 carbon atoms is a monovalent aliphatic, cycloaliphatic, aromatic or heterocyclic group.

$R_1$ as an aliphatic group having 1 to 18 carbon atoms is, for example, a linear or branched alkyl group, which is unsubstituted or substituted, for example by a heterocyclic group, by a carboxyl group or by an alkyl carboxylate group;

however, this aliphatic group can also be an alkoxy group, such as methoxy, or an alkoxyalkoxy group; however, the aliphatic group can also be an amino group of the formula

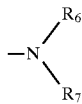

in which $R_6$ and $R_7$, independently of one another, are hydrogen or an unsubstituted $C_1$–$C_6$alkyl group or a $C_1$–$C_6$alkyl group which is monosubstituted or polysubstituted by, for example, COOH or COO($C_1$–$C_4$alkyl).

$R_6$ and $R_7$ are preferably, independently of one another, hydrogen or a methyl group.

If $R_1$ is a cycloaliphatic group, it is, for example, cyclopentyl, cyclohexyl, methylcyclohexyl, 1,3-dimethylcyclohexyl, 1-methyl-4-isopropylcyclohexyl, cycloheptyl or cyclooctyl.

If $R_1$ is an aromatic group, it is, in particular, a phenyl group, which is unsubstituted or substituted (for example by halogen, $C_1$–$C_4$alkyl or $C_1$–$C_4$alkoxy).

If $R_1$ is a heterocyclic group, it is, in particular, a radical of a five-membered heterocyclic ring containing one ring member other than carbon, such as —S—, —O— or —NH—, for example furan, thiophene, pyrrole, pyrrolidone, pyroglutamic acid, maleimide of the formula

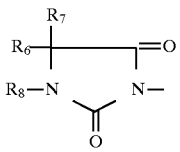

(in which $R_9$ and $R_{10}$, independently of one another, are hydrogen, $C_1$–$C_4$alkyl, in particular methyl, or aryl, such as phenyl, or halogen, such as F, Cl or Br; $R_9$ and $R_{10}$ are preferably hydrogen or methyl), coumarone, thiocoumarone or indole; a five-membered heterocyclic ring containing two ring members other than carbon, such as —O—, —S— or —NH—, for example oxazole, isoxazole, thiazole, imidazole, hydantoin of the formula

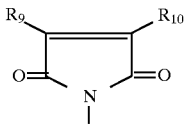

(in which $R_6$, $R_7$ and $R_8$, independently of one another, are hydrogen or a $C_1$–$C_6$alkyl group which is unsubstituted or monosubstituted or polysubstituted by, for example, COOH or COO($C_1$–$C_4$alkyl); a 5-membered heterocyclic ring containing three or more ring members other than carbon, such as —O— or —NH— for example furazan, 1,2,3-triazole, 1,2,4-triazole, 1,3,4-triazole or tetrazole; a 6-membered heterocyclic ring containing one ring member other than carbon, for example —O—, —S— or —NH—, for example pyran, thiopyran, pyridine or quinoline; or a 6-membered heterocyclic ring containing more than one ring member other than carbon, such as —N—, for example diazines, such as oiazine, miazine, dihydrouracil of the formula

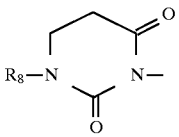

(in which $R_8$ is as defined above) or piazine, vicinal, asymmetrical or symmetrical triazine or 1,2,3,4-triazine, 1,2,3,5-triazine or 1,2,4,5-triazine.

Preferred heterocyclic groups are radicals of five-membered heterocyclic rings containing one or two ring members other than carbon, in particular —NH—, in particular those of imidazole, maleimide and pyrrolidone.

An organic radical A having 1 to 18 carbon atoms is an aliphatic, cycloaliphatic or aromatic radical. Particularly suitable aliphatic radicals are linear or branched alkyl groups, such as the methyl, ethyl, propyl, isopropyl, butyl, pentyl, hexyl, heptyl, octyl, nonyl, decyl, undecyl, dodecyl, tridecyl, tetradecyl, pentadecyl, hexadecyl, heptadecyl and octadecyl groups; examples of suitable cycloaliphatic radicals are those listed under the symbol $R_1$; an aromatic group A is, for example, a phenyl group which is unsubstituted or substituted by, for example, $C_1$–$C_4$alkyl or $C_1$–$C_4$alkoxy.

If A is an aliphatic radical, this can be substituted by a heterocyclic group, suitable heterocyclic groups being, in principle, all those defined under $R_1$ which are bonded to the isocyanate radical —NCO, in particular via a $C_1$–$C_6$alkyl group, especially via an ethyl group.

Preferred groups A are aliphatic $C_1$–$C_6$alkyl groups, in particular ethyl and isopropyl, furthermore cyclohexyl and in particular $C_1$–$C_6$alkyl which is substituted by a heterocyclic group, where the heterocyclic group is preferably a radical of a five-membered heterocyclic ring containing one or two ring members other than carbon, in particular —NH—, in particular a radical of imidazole, maleimide or pyrrolidone. Particularly preferred groups A are, for example, those of the formulae

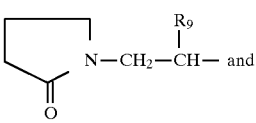

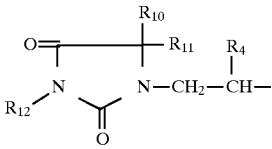

in which $R_4$ is hydrogen or a $C_1$–$C_6$alkyl group, $R_9$ is as defined above, in particular hydrogen or methyl, $R_{10}$ and $R_{11}$, independently of one another, are hydrogen or a linear or branched $C_1$–$C_{12}$alkyl radical, in particular a $C_1$–$C_5$alkyl radical, especially a methyl radical, and $R_{12}$ is a linear or branched $C_1$–$C_{12}$alkyl radical, which may be interrupted by an oxygen atom, in particular a methyl or ethyl radical.

The preferred novel crosslinkable polymers comprising a crosslinkable group and at least one further modifier are, in particular, derivatives of a polyvinyl alcohol having a molecular weight of at least about 2000 which comprises from about 0.5 to about 80%, based on the number of hydroxyl groups in the polyvinyl alcohol, of, in particular, units of the formula V or IX.

The novel crosslinkable polymers comprising a crosslinkable group and at least one further modifier are preferably derivatives of polyvinyl alcohol having a mean molecular weight of at least about 2000 which comprises from about 0.5 to about 80%, in particular from about 1 to 50%, further preferably from about 1 to 25%, preferably from about 2 to 15%, particularly preferably from about 2 to 10%, based on the number of hydroxyl groups of the polyvinyl alcohol, of units of the formula XI, XII and/or XIII. Novel crosslinkable polymers comprising a crosslinkable group and at least one further modifier which are intended for the production of contact lenses comprise, in particular, from about 0.5 to about 25%, in particular from about 1 to 15%, particularly preferably from about 2 to 12%, based on the number of hydroxyl groups of the polyvinyl alcohol, of units of the formula XI, XII and/or XIII.

Polyvinyl alcohols which can be derivatized in accordance with the invention preferably have a mean molecular weight of at least 10,000. The upper limit to their mean molecular weight is up to 1,000,000. They preferably have a mean molecular weight of up to 300,000, in particular of up to 100,000, very particularly preferably of up to about 70,000.

Polyvinyl alcohols which are suitable according to the invention usually principally have a poly(2-hydroxy) structure. However, polyvinyl alcohols derivatized in accordance with the invention can also contain hydroxyl groups in the form of 1,2-glycols, such as copolymer units of 1,2-dihydroxyethylene, as can be obtained, for example, by alkaline hydrolysis of vinyl acetate-vinylene carbonate copolymers.

In addition, the polyvinyl alcohols derivatized in accordance with the invention can also contain small proportions, for example of up to 20%, preferably of up to 5%, of copolymer units of ethylene, propylene, acrylamide, methacrylamide, dimethacrylamide, hydroxyethyl methacrylate, methyl methacrylate, methyl acrylate, ethyl acrylate, vinylpyrrolidone, hydroxyethyl acrylate, allyl alcohol, styrene or similar comonomers usually used.

Polyvinyl alcohols (PVA) which can be used as starting polymers are commercially available polyvinyl alcohols, for example Vinol® 107 from Air Products (MW=22,000 to 31,000, 98–98.8% hydrolysed), Polysciences 4397 (MW= 25,000, 98.5% hydrolysed), BF 14 from Chan Chun, Elvanol® 90-50 from DuPont and UF-120 from Unitika. Other producers are, for example, Nippon Gohsei (Gohsenol®), Monsanto (Gelvatol®), Wacker (Polyviol®) or the Japanese producers Kuraray, Denki and Shin-Etsu. However, it is advantageous to use Mowiol® products from Hoechst, in particular those of the 3-83, 4-88, 4-98, 6-88, 6-98, 8-88, 8-98, 10-98, 20-98, 26-88 and 40-88 type.

The PVAs are prepared by basic or acidic, partial or virtually complete hydrolysis of polyvinyl acetate.

As mentioned above, it is also possible to use copolymers of hydrolysed or partially hydrolysed vinyl acetate, which are obtainable, for example, as hydrolysed ethylene-vinyl acetate (EVA), or vinyl chloride-vinyl acetate, N-vinylpyrrolidone-vinyl acetate and maleic anhydride-vinyl acetate.

Polyvinyl alcohol is usually prepared by hydrolysis of the corresponding homopolymeric polyvinyl acetate. In a preferred embodiment, the polyvinyl alcohol derivatized in accordance with the invention comprises less than 50% of polyvinyl acetate units, in particular less than 20% of polyvinyl acetate units. Preferred amounts of residual acetate units in the polyvinyl alcohol derivatized in accordance with the invention are, based on the total amount of vinyl alcohol units and acetate units, from about 2 to 20%, preferably from about 2 to 16%, in particular from 2 to 12%, especially from 0.5 to 3%.

The compounds comprising units of the formula V and also hydroxyl and acetate groups can be prepared in a manner known per se. For example, a polyvinyl alcohol having a mean molecular weight of at least about 2000 which comprises units of the formula I

—CH(OH)—CH$_2$— (I)

can be reacted with from about 0.5 to 80%, based on the number of hydroxyl groups in the polyvinyl alcohol, of a compound of the formula II

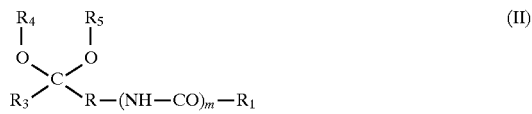

in which $R_4$ and $R_5$, independently of one another, are hydrogen or $C_1$–$C_6$alkyl, in particular methyl or ethyl and the other symbols are as defined under the formula XII, in particular in an acidic medium.

This gives a polyvinyl alcohol polymer containing acetal- or ketal-bonded groups which conforms to the formula XII

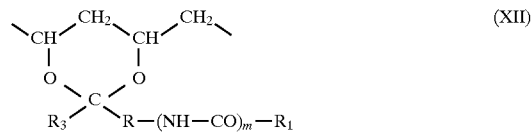

in which the symbols $R_3$, R, $R_1$ and m are as defined above.

The polymer of the formula XII is water-soluble and is isolated from the reaction solution, for example by precipitation in acetone.

In a second step, the polymer of the formula XII is reacted with an isocyanate compound of the formula IV

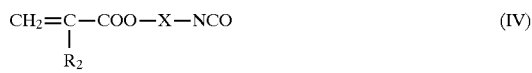

CH$_2$=C—COO—X—NCO (IV)
       |
       R$_2$ which is known and in which the symbols X and $R_2$ are as defined above, for example 2-isocyanatoethyl methacrylate, in an aprotic polar solvent at elevated temperature to give the crosslinkable polymer of the formula V.

Examples of suitable aprotic polar solvents are formamide, dimethylformamide (DMF), hexamethylphosphoric triamide (HMPT) and in particular dimethyl sulfoxide (DMSO).

The term elevated temperature here is taken to mean a range of from about 20° to 100° C., in particular from 40° to 80° C., especially from 75° to 80° C.

The acetals and ketals of the formula II and the polymer of the formula XII are novel and represent a further subject-matter of the invention.

The acetals and ketals of the formula II in which m is 0 are obtained, for example, by reacting a bromoacetal/ketal of the formula

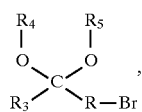

for example 2-bromoacetaldehyde dimethyl acetal, with a compound $R_1$—H which introduces the group $R_1$, for example 5,5-dimethylhydantoin, at a temperature of from about 80° C. to 150° C. in an aprotic polar solvent, in particular DMF or DMSO, in the presence of anhydrous $K_2CO_3$.

The acetals and ketals of the formula II in which m is 1 can be prepared by various methods, for example starting from a monocarboxylic acid $R_1$—COOH via 1,1'-carbonyldiimidazole and an aminoacetaldehyde alkyl acetal by the following reaction scheme:

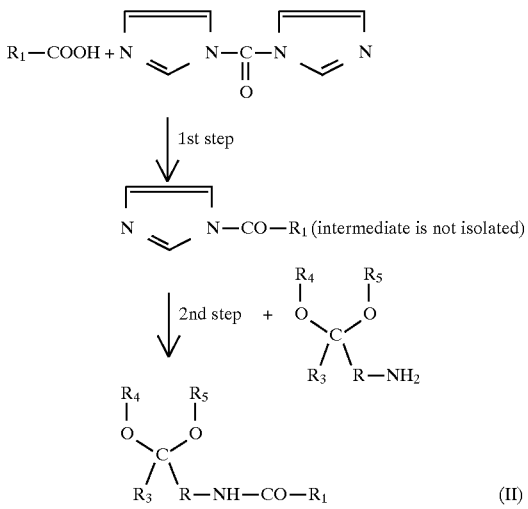

The reaction in the 1st step and also in the 2nd step is carried out in an organic solvent, for example tetrahydrofuran or dimethylformamide, at a temperature of from about 20° to 60° C.

Examples of suitable monocarboxylic acids $R_1$—COOH are 3-(2-oxopyrrolidin-1-yl)-propionic acid, 3-(4,4-dimethyl-2,5-dioxoimidazolidin-1-yl)propionic acid and 3-(3,5,5-trimethyl -2,4-dioxoimidazolidin-1-yl)propionic acid.

The acetal/ketal is in particular 2-aminoacetaldehyde dimethyl acetal.

Another method of preparing the acetals/ketals of the formula II in which m is 1 is a Michael addition of —NH—$R_1$ onto an α, β-unsaturated carbonyl compound, for example

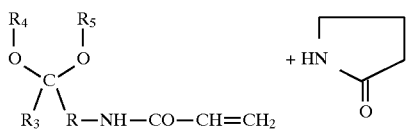

in the presence of a catalyst, for example a basic catalyst such as sodium ethoxide or pyridine, or a quaternary ammonium base, such as benzyltrimethylammonium hydroxide, or an alkali metal hydroxide (for example NaOH or KOH), or via an acid chloride, for example

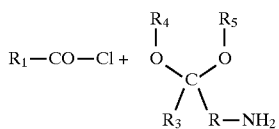

in an organic solvent, such as tetrahydrofuran or dimethylformamide, at a temperature of from about 20° to 50° C.

The isolated polymer of the formula XII can be reacted analogously, in a 2nd step, with a vinyl ether isocyanate of the formula VI $$CH_2=CH-O-Z-O-CO-NH-Y-NCO \qquad (VI)$$

in which the symbols Z and Y are as defined above, in an aprotic polar solvent at elevated temperature to give the crosslinkable polymer of the formula VII.

The isocyanates of the formula VI are novel and likewise represent a further subject-matter of the invention.

These are obtained, for example, by reacting a hydroxyalkyl vinyl ether of the formula $$CH_2=CH-O-Z-OH$$

with a diisocyanate of the formula $$OCN-Y-NCO$$

containing different reactive isocyanate groups (for example one isocyanate group is sterically hindered and the other is not) in an aprotic polar solvent, such as DMSO, at a temperature of from about 20° C. to 80° C., if desired in the presence of a catalyst, such as dibutyltin dilaurate, a tertiary amine, such as N,N-dimethylcyclohexylamine or N,N-dimethylbenzylamine.

The polymers comprising crosslinkable units of the formulae V and VII are thus crosslinkable polymers containing a crosslinkable group [(meth)acrylate or vinyl ether group] bonded via urethane and an acetal/ketal group as further modifier.

The urethane-urethane-modified crosslinkable polymers comprising units of the formula IX are obtained by reacting a polyvinyl alcohol having a molecular weight of at least about 2000 which comprises units of the formula I $$—CH(OH)—CH_2— \qquad (I)$$

and also acetate groups with from about 0.5 to 80%, based on the number of hydroxyl groups in the polyvinyl alcohol, of an isocyanate of the formula IV $$CH_2=C-CO-O-X-NCO \qquad (IV)$$
$$\phantom{CH_2=}|$$
$$\phantom{CH_2=C-CO-O-X-}R_2$$

and an isocyanate of the formula VIII $$A-NCO \qquad (VIII)$$

in which the symbols $R_2$, X and A are as defined above, in a one-pot process in an aprotic polar solvent at elevated temperature.

Suitable aprotic polar solvents are those already mentioned in connection with the preparation of the polymers of the formula V; the same applies to the elevated temperature.

Whereas the isocyanates of the formula IV are known, for example 2-isocyanatoethyl methacrylate, and can be prepared by known processes, some of the isocyanates of the formula VIII are novel and to this extent represent a further subject-matter of the invention.

The isocyanates of the formula VIII can be obtained, for example, by hydrolyzing a nitrile (of the formula A—CN) to an acid (of the formula A—COOH) in a manner known per se and subsequently converting the latter into the acid chloride (of the formula C—COCl) using a chlorinating agent and then reacting the acid chloride with an azide, such as sodium azide or trimethylsilyl azide, in an organic solvent, such as toluene.

Another possibility is to hydrogenate a nitrile (of the formula A—CN) to the amine (of the formula A—$NH_2$) and then to react this with phosgene.

The symbols A, X and $R_2$ are as defined above.

An example which may be mentioned of such isocyanates of the formula VIII is 1-(2-isocyanatoethyl)-3-methylimidazolidine-2,4-dione.

The urethane-urethane-modified, crosslinkable polymers of the formula X are obtained analogously by reacting a polyvinyl alcohol having a molecular weight of at least about 2000 which comprises units of the formula I

—CH(OH)—CH$_2$— (I)

and also acetate groups with from about 0.5 to 80%, based on the number of hydroxyl groups in the polyvinyl alcohol, of an isocyanate of the formula VI

CH$_2$=CH—O—Z—O—CO—NH—Y—NCO (VI)

and an isocyanate of the formula VIII

A—NCO (VIII)

in which the symbols Z, Y and A are as defined above, in a one-pot process in an aprotic polar solvent at elevated temperature to give the crosslinkable polymer of the formula X.

Suitable aprotic polar solvents are those mentioned above in connection with the preparation of the polymers of the formula V; the same applies to the elevated temperature.

The novel crosslinkable polymers (prepolymers) comprising units of formulae XI and XII or XIII are water-soluble.

Surprisingly, the crosslinkable polymers comprising units of the formulae XI and XII or XIII are extremely stable. This is unexpected to the person skilled in the art since higher-functional acrylates, for example, usually require stabilization. If such compounds are not stabilized, rapid polymerization usually occurs. However, spontaneous crosslinking due to homopolymerization does not occur with the novel crosslinkable polymers. The crosslinkable polymers can, in addition, be purified in a manner known per se, for example, as mentioned, by precipitation with acetone, dialysis or ultrafiltration, particular preference being given to ultrafiltration. This purification operation allows the crosslinkable polymers to be obtained in extremely pure form, for example as concentrated aqueous solutions, which are free or at least substantially free from reaction products, such as salts, and starting materials, or other non-polymeric constituents.

The preferred method for the purification of the novel crosslinkable polymers, ultrafiltration, can be carried out in a manner known per se. It is possible to carry out the ultrafiltration repeatedly, for example from two to ten times. Alternatively, the ultrafiltration can also be carried out continuously until the desired degree of purity has been achieved. The desired degree of purity can in principle be as great as desired. A suitable measure of the degree of purity is, for example, the NMR spectrum of the solution in DMSO or elemental analysis (N$_2$ content), gel permeation chromatography or HPLC.

In addition to the units of the formulae XI, XII or XIII, the novel water-soluble, crosslinkable polymers can also comprise further modifier units. Of the many possibilities for such modifiers, the following are mentioned by way of example:

Further units containing crosslinkable groups are, for example, those of the formulae A and B

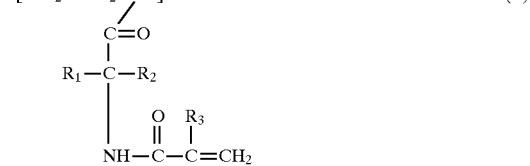
(A)

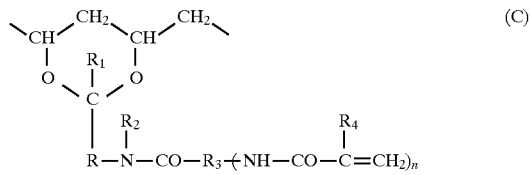
(B)

in which

R$_1$ and R$_2$ embody amino acid radicals and are, independently of one another: hydrogen, a C$_1$–C$_8$alkyl group, an aryl group or a cyclohexyl group, these groups being unsubstituted or monosubstituted or polysubstituted, R$_3$ is hydrogen or a C$_1$–C$_4$alkyl group, and R$_4$ is an —O— or —NH— bridge.

Further units containing crosslinkable groups are, for example, those of the formula C

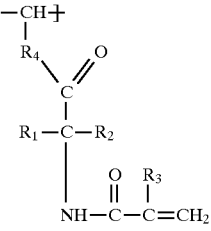
(C)

in which

R is a linear or branched bivalent radical of a C$_1$–C$_{12}$alkane, preferably of a C$_1$–C$_6$alkane, R$_1$ is hydrogen, a C$_1$–C$_6$alkyl group or a cycloalkyl group, preferably a cyclohexyl group, R$_2$ is hydrogen or a C$_1$–C$_6$alkyl group, R$_3$ is the

group if n=0, or the

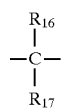

bridge if n=1,

R$_4$ is hydrogen or C$_1$–C$_4$alkyl, n is zero or 1, preferably 0, and

R$_{16}$ and R$_{17}$, independently of one another, are hydrogen, linear or branched C$_1$–C$_8$alkyl, aryl, preferably phenyl, or cyclohexyl;

or those of the formula D

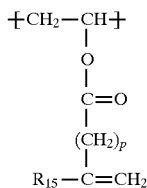

in which $R_{15}$ is hydrogen or a $C_1$–$C_4$alkyl group, in particular $CH_3$, and p is from zero to 6, preferably from zero to 2, in particular zero.

Units which contain a bound photoinitiator are, in particular, those of the formula E

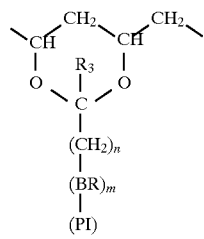

in which

BR is an

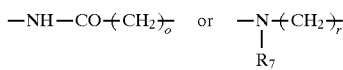

bridge or a quaternary salt thereof which has the formula

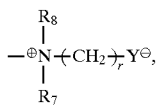

PI is the radical of a photoinitiator from the class consisting of the benzoins, such as benzoin ethers, for example benzoin methyl ether, benzoin ethyl ether, benzoin isopropyl ether and benzoin phenyl ether, and benzoin acetate; acetophenones, such as acetophenone, 2,2-dimethoxyacetophenone and 1,1-dichloroacetophenone; benzil, benzil ketals, such as benzil dimethyl ketal and benzil diethyl ketal; anthraquinones, such as 2-methylanthraquinone, 2-ethylanthraquinone, 2-tert-butyl anthraquinone, 1-chloroanthraquinone and 2-amylanthraquinone; furthermore benzophenones, such as benzophenone and 4,4'-bis(N,N'-dimethylamino) benzophenone; thioxanthones and xanthones; acridine derivatives; phenazine derivatives; quinoxaline derivatives; and 1-aminophenyl ketones and in particular 1-hydroxyphenyl ketones, in particular those of the formula

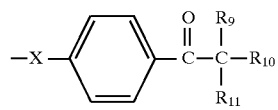

in which

X is —O—, —S— or —N($R_{12}$)—,

Y is a counterion, such as $H_2SO_4^\ominus$, $F^\ominus$, $Cl^\ominus$, $Br^\ominus$, $I^\ominus$, $CH_3COO^\ominus$, $OH^\ominus$, $BF_4^\ominus$ or $H_2PO_4^\ominus$, $R_3$ is hydrogen, a $C_1$–$C_6$alkyl group or a cycloalkyl group, $R_7$ is hydrogen; unsubstituted or substituted, linear or branched $C_1$–$C_{12}$alkyl; the —$(CH_2)_r$—PI group or the —CO—$R_{13}$ group, in which $R_{13}$ is linear or branched $C_1$–$C_6$alkyl which is unsubstituted or substituted by —COOH or acrylamide, or an unsubstituted, linear or branched radical of a $C_3$–$C_8$olefin, $R_8$ is hydrogen, or unsubstituted or substituted, linear or branched $C_1$–$C_4$alkyl so long as $R_7$ is not —CO—$R_{13}$, $R_9$ is unsubstituted or substituted, linear or branched $C_1$–$C_6$alkyl, unsubstituted or substituted, linear or branched $C_1$–$C_6$alkoxy, a 6-membered carbocyclic or heterocyclic ring, or an unsubstituted linear or branched radical of a $C_3$–$C_8$olefin, $R_{10}$ is a group of the formula —$OR_{14}$ or

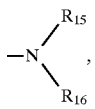

$R_{11}$ is unsubstituted or substituted, linear or branched $C_1$–$C_6$alkyl, a 6-membered carbocyclic or heterocyclic ring, an unsubstituted, linear or branched radical of a $C_3$–$C_8$olefin, or aryl, where $R_9$ and $R_{11}$ together can also be cyclized to form a 5- or 6-membered carbocyclic ring, $R_{12}$ is hydrogen or unsubstituted, linear or branched $C_1$–$C_4$alkyl, $R_{14}$ is hydrogen or unsubstituted or substituted, linear or branched $C_1$–$C_4$alkyl, $R_{15}$ and $R_{16}$, independently of one another, are unsubstituted, linear or branched $C_1$–$C_4$alkyl, or $R_{15}$ and $R_{16}$ can be bonded together to form a 5- or 6-membered heterocyclic ring, m is 0 or 1, n is a number from 1 to 12, o is a number from 1 to 6, and r is a number from 2 to 6, where substituted radicals are substituted, in particular, by $C_1$–$C_4$alkyl or by $C_1C_4$alkoxy, with the following provisos:

if the BR bridge is a quaternary salt, n is a number from 2 to 12;

$R_{14}$ is not hydrogen if $R_9$ is a $C_1$–$C_6$alkoxy radical; and $R_7$ is —CO—$R_{13}$ when n=1.

Examples of units containing basic groups are those of the formula F

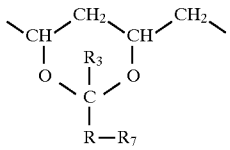

in which R is a linear or branched bivalent radical of a $C_1$–$C_{12}$alkane, and $R_3$ is hydrogen, a $C_1$–$C_6$alkyl group or a cycloalkyl group, and $R_7$ is a basic primary, secondary or tertiary amino group, in particular a secondary or tertiary amino group which is substituted by $C_1$–$C_6$alkyl, or a quaternary amino group of the formula

—N⊕(R')$_3$X⊖ in which R' is hydrogen or, independently of one another, a $C_1$–$C_{12}$alkyl radical, in particular a $C_1$–$C_4$alkyl radical, and X is a counterion, for example $HSO_4^\ominus$, $F^\ominus$, $Cl^\ominus$, $Br^\ominus$, $I^\ominus$, $CH_3COO^\ominus$, $OH^\ominus$, $BF^\ominus$ or $H_2PO_4^\ominus$.

Examples of units containing acidic groups are those of the formula G

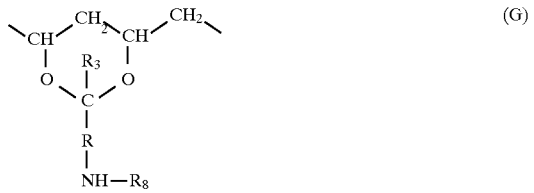

in which R and $R_3$ are as defined under the formula F, and $R_8$ is the radical of a monobasic, dibasic or tribasic aliphatic or aromatic, saturated or unsaturated organic acid.

Examples of units containing a covalently bonded reactive dye radical are those of the formula H, I, J or K

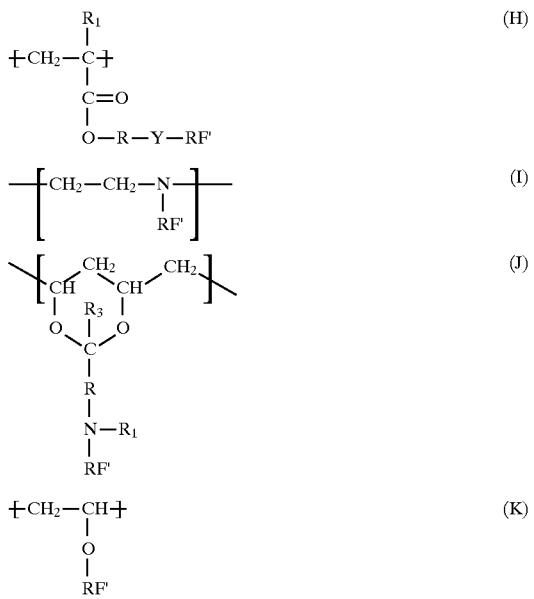

in which
RF' is a radical of the formula

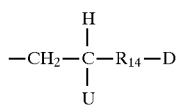

in which
D is the radical of an organic dye,
$R_{14}$ is a divalent electron-withdrawing group,
U is hydrogen or halogen,
R is the divalent radical of a $C_1$–$C_{12}$alkane,
$R_1$ is hydrogen or $C_1$–$C_4$alkyl,
$R_3$ is hydrogen, $C_1$–$C_6$alkyl or cycloalkyl, and
Y is —O— or —N($R_1$)—.

The novel crosslinkable polymers can be crosslinked in an extremely effective and targeted manner, in particular by photochemical crosslinking.

The present invention therefore furthermore relates to a photocrosslinked polymer which can be obtained by photocrosslinking a crosslinkable polymer comprising units of the formulae XI and XII or XIII in the presence or absence of an additional vinylic comonomer. These photocrosslinked polymers are three-dimensional polymeric networks through the formation of covalent and non covalent (for example coordinative, ionic, etc.) bonds and are insoluble, but swellable, in water.

In the case of photochemical crosslinking (photocrosslinking), it is expedient to add a photoinitiator which is capable of initiating free-radical crosslinking. The crosslinking can then be initiated by actinic or ionizing radiation.

The photocrosslinking is carried out in a suitable solvent. Such solvents are in principle all those which dissolve the polyvinyl alcohol and any vinylic comonomers additionally used.

The photocrosslinking is preferably carried out from an aqueous solution of the novel crosslinkable polymers, which can be obtained as a result of the preferred purification step, namely ultrafiltration, if desired after addition of an additional vinylic comonomer.

The vinylic comonomer which can additionally be used in accordance with the invention in the photocrosslinking can be hydrophilic, hydrophobic or a mixture of hydrophobic and hydrophilic vinylic monomers. Suitable vinylic monomers include, in particular, those which are usually used in the production of contact lenses. The term "hydrophilic vinylic monomer" is taken to mean a monomer which, as a homopolymer, typically gives a polymer which is soluble in water or is capable of absorbing at least 10% by weight of water. Analogously, the term "hydrophobic vinylic monomer" is taken to mean a monomer which, as a homopolymer, typically gives a polymer which is insoluble in water or is capable of absorbing less than 10 per cent by weight of water.

In general, from about 0.01 to 80 units of a typical vinylic comonomer react per unit of formula XI.

If a vinylic comonomer is used, the photocrosslinked novel polymers preferably comprise from about 1 to 15 per cent, particularly preferably from about 3 to 8 per cent, of units of the formulae XI and XII or XIII, based, for example, on the number of hydroxyl groups in the polyvinyl alcohol, which are reacted with from about 0.1 to 80 units of the vinylic monomer.

The proportion of vinylic comonomers, if used, is preferably from 0.5 to 80 units per unit of the formulae XI and XII or XIII, in particular from 1 to 30 units of vinylic comonomer per unit of the formulae XI and XII or XIII, particularly preferably from 5 to 20 units per unit of the formulae XI and XII or XIII.

It is furthermore preferred to use a hydrophobic vinylic comonomer or a mixture of a hydrophobic vinylic comonomer and a hydrophilic vinylic comonomer which comprises at least 50 per cent by weight of a hydrophobic vinylic comonomer. This allows the mechanical properties of the photocrosslinked polymer to be improved without drastically reducing the water content. However, both conventional hydrophobic vinylic comonomers and conventional hydrophilic vinylic comonomers are in principle suitable for the copolymerization with polyvinyl alcohol containing groups of the formulae XI and XII or XIII.

Suitable hydrophobic vinylic comonomers include, without this being a comprehensive list, $C_1$–$C_{18}$alkyl acrylates and methacrylates, $C_3$–$C_{18}$alkylacrylamides and -methacrylamides, acrylonitrile, methacrylonitrile, vinyl $C_1$–$C_{18}$alkanoates, $C_2$–$C_{18}$ alkenes, $C_2$–$C_{18}$haloalkenes, styrene, $C_1$–$C_6$alkylstyrene, vinyl alkyl ethers in which the alkyl moiety has 1 to 6 carbon atoms, $C_2$–$C_{10}$perfluoroalkyl acrylates and methacrylates and correspondingly partially fluorinated acrylates and methacrylates, $C_3$–$C_{12}$perfluoroalkyl ethylthiocarbonylaminoethyl acrylates and -methacrylates, acryloxy- and methacryloxyalkylsiloxanes, N-vinylcarbazole, $C_1$–$C_{12}$alkyl esters of maleic acid, fumaric acid, itaconic acid, mesaconic acid and the like. Preference is given to, for example, $C_1$–$C_4$alkyl esters of vinylically unsaturated carboxylic acids having 3 to 5 carbon atoms or vinyl esters of carboxylic acids having up to 5 carbon atoms.

Examples of suitable hydrophobic vinylic comonomers include methyl acrylate, ethyl acrylate, propyl acrylate, isopropyl acrylate, cyclohexyl acrylate, 2-ethylhexyl acrylate, methyl methacrylate, ethyl methacrylate, propyl methacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyltoluene, vinyl ethyl ether, perfluorohexylethylthiocarbonylaminoethyl methacrylate, isobornyl methacrylate, trifluoroethyl methacrylate, hexafluoroisopropyl methacrylate, hexafluorobutyl methacrylate, tris(trimethylsilyloxy)silylpropyl methacrylate, 3-methacryloxypropyl-pentamethyldisiloxane and bis(methacryloxypropyl)tetramethyldisiloxane.

Suitable hydrophilic vinylic comonomers include, without this being a comprehensive list, hydroxy-substituted lower alkyl acrylates and methacrylates, acrylamide, methacrylamide, lower alkylacrylamides and -methacrylamides, methoxylated acrylates and methacrylates, hydroxy-substituted lower alkylacrylamides and -methacrylamides, hydroxy-substituted lower alkyl vinyl ethers, sodium ethylenesulfonate, sodium styrenesulfonate, 2-acrylamido-2-methylpropanesulfonic acid, N-vinylpyrrole, N-vinylsuccinimide, N-vinylpyrrolidone, 2- and 4-vinylpyridine, acrylic acid, methacrylic acid, amino- (where the term "amino" also covers quaternary ammonium), mono(lower alkyl)amino- or di(lower alkyl)amino(lower alkyl) acrylates and methacrylates allyl alcohol and the like. Preference is given to, for example, hydroxy-substituted $C_2$–$C_4$alkyl (meth)acrylates, five-to seven-membered N-vinyllactams, N,N-di-$C_1$–$C_4$alkyl(meth)acrylamides and vinylically unsaturated carboxylic acids having a total of 3 to 5 carbon atoms.

Examples of suitable hydrophilic vinylic comonomers include hydroxyethyl methacrylate, hydroxyethyl acrylate, acrylamide, methacrylamide, dimethylacrylamide, allyl alcohol, vinylpyridine, vinylpyrrolidone, glycerol methacrylate, N-(1,1-dimethyl-3-oxobutyl)acrylamide and the like.

Preferred hydrophobic vinylic comonomers are methyl methacrylate and vinyl acetate.

Preferred hydrophilic vinylic comonomers are 2-hydroxyethyl methacrylate, N-vinylpyrrolidone and acrylamide.

However, suitable comonomers also include the crosslinkable polymers comprising units of the formulae XI and XII or XIII themselves, it being possible, for example, for a crosslinkable polymer of formula V to be compolymerized, for example with a crosslinkable polymer of the formula IX, and also terpolymerized, for example also with a crosslinkable polymer of the formula VII.

The novel crosslinkable polymers can be converted into mouldings, in particular contact lenses, in a manner known per se, for example by carrying out the photocrosslinking of novel crosslinkable polymers in a suitable contact-lens mould. The invention therefore furthermore relates to mouldings essentially comprising a novel crosslinkable polymer comprising units of the formulae XI and XII or XIII. Further examples of novel mouldings, besides contact lenses, are biomedical mouldings and mouldings for specifically ophthalmic purposes, for example intraocular lenses, eye bandages, mouldings which can be used in surgery, such as heart valves, artificial arteries or the like, furthermore films and membranes, for example membranes for diffusion control, photostructurable films for information storage, and photoresist materials, for example membranes and mouldings for etch resists and screen printing resists.

A specific embodiment of the invention relates to contact lenses which comprise a novel crosslinked polymer made from a crosslinkable polymer comprising units of the formulae XI and XII or XIII or essentially comprise or consist of a novel crosslinked polymer. Contact lenses of this type have a range of unusual and extremely advantageous properties, including, for example, excellent compatibility with the human cornea, based on a balanced ratio between water content (about 50–90% by weight, in particular 60–85% by weight), high oxygen permeability and very good mechanical properties, for example transparency, clarity, freedom from stresses and tear strength. In addition, the novel contact lenses have high dimensional stability. Even after autoclaving one or more times at, for example, about 120° C. for about 30–40 minutes, no changes in shape are observed.

It is furthermore emphasized that the novel contact lenses, ie. those comprising a crosslinked polymer made from a crosslinkable polymer comprising units of the formulae XI and XII or XIII can be produced very simply and efficiently compared with the prior art. This is due to a number of factors. Firstly, the starting materials, such as the polyvinyl alcohol, are inexpensive to obtain or prepare. Secondly, it is advantageous that the crosslinkable polymers are surprisingly stable, so that they can be subjected to very substantial purification. The crosslinking can therefore be carried out using a crosslinkable polymer which requires virtually no subsequent purification, such as, in particular, complex extraction of unpolymerized constituents. Furthermore, the crosslinking can be carried out in purely aqueous solution, so that a subsequent hydration step is unnecessary. Finally, the photocrosslinking takes place within about 5–20 seconds, so that the process for the production of the novel contact lenses can be designed to be extremely economical from this point of view too.

All the above advantages naturally apply not only to contact lenses, but also to the other mouldings mentioned. The totality of the various advantageous aspects in the production of novel mouldings results in novel mouldings being particularly suitable as mass-produced articles, for example as contact lenses, which are also worn for a short time span (from about 1 to 14 days, preferably from about 1 to 4 days) and are then replaced by new lenses.

The present invention furthermore relates to the production of the novel mouldings, in particular the novel contact lenses. These processes are illustrated below using the example of contact lenses. However, these processes can also be used for the other mouldings mentioned.

The novel contact lenses can be produced in a manner known per se, for example in a conventional spin-casting mould, as described, for example, in U.S. Pat. No. 3,408,429, or by the full-mould process in a static mould, as described, for example, in U.S. Pat. No. 4,347,198.

It has been observed in accordance with the invention that the process described above with reference to crosslinkable PVA polymers is of general applicability. The present invention therefore also relates to a novel process for the production of polymeric mouldings, in particular contact lenses, in which a water-soluble crosslinkable polymer comprising crosslinkable units of the formulae XI and XII, XI and XIII or XI, XII and XIII is crosslinked in solution, and to mouldings, in particular contact lenses, obtainable by this process.

In detail, this process for the production of mouldings, in particular contact lenses, comprises the following steps:

a) preparation of an essentially aqueous solution of a water-soluble crosslinkable polymer comprising crosslinkable units of the formula XI

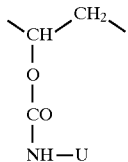 (XI)

and at least one further modifier comprising units of the formula XII

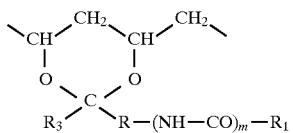 (XII)

or units of the formula XIII

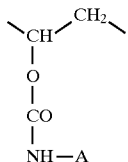 (XIII)

in which
U is an

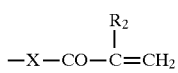

or $-Y-NH-CO-O-Z-O-CH=CH_2$ group,
X is a bridge having 2 to 12 carbon atoms,
$R_2$ is hydrogen or a $C_2-C_4$alkyl group,
Y is a bridge having 7 to 12 carbon atoms,
Z is a $C_2-C_{12}$alkylene bridge, which may be interrupted once or more than once by an oxygen atom,
$R_3$ is hydrogen, a $C_1-C_6$alkyl group or a cycloalkyl group,
R is a $C_1-C_{12}$alkylene bridge,
$R_1$ is an organic group having 1 to 18 carbon atoms,
A is an organic radical having 1 to 18 carbon atoms, and
m is 0 or 1, b) introduction of the resultant solution into a mould,
c) initiation of the crosslinking in water or in an organic solvent in which the crosslinkable polymer is dissolved, and
d) opening of the mould so that the moulding can be removed.

Unless expressly excluded below, the comments and preferences given above in connection with the crosslinkable PVA polymers comprising units of the formulae XI and XIII or XIII and the comments and preferences given in connection with the processes for the preparation of polymers and production of mouldings, in particular contact lenses, from these crosslinkable polymers also apply in connection with the above-described process comprising steps a), b), c) and d). This applies to all cases in which the comments and preferences in connection with crosslinkable PVA polymers comprising units of the formulae XI, XII or XIII can be applied appropriately to the process described above.

The crucial criteria regarding whether a crosslinkable polymer can be employed in the novel process are that the crosslinkable polymer is soluble in water and comprises units of the formulae XI and XII or XIII.

An essentially aqueous solution of a novel crosslinkable polymer can be prepared in a manner known per se, for example by isolating the crosslinkable polymer, for example in pure form, ie. free from undesired constituents, and dissolving the crosslinkable polymer in an essentially aqueous medium.

The criterion that the crosslinkable polymer is soluble in water is, for the purposes of the invention, taken to mean in particular that the crosslinkable polymer is soluble in an essentially aqueous solution at 20° C. in a concentration of from about 3 to 90 per cent by weight, preferably from about 5 to 60 per cent by weight, in particular from about 10 to 60 per cent by weight. If possible in individual cases, crosslinkable polymer concentrations of greater than 90% are also included for the purposes of the invention. Particular preference is given to crosslinkable polymer concentrations in solution of from about 15 to about 50 per cent by weight, in particular from about 15 to about 40 per cent by weight, for example from about 20 to about 40 per cent by weight.

For the purposes of this invention, essentially aqueous solutions of the crosslinkable polymer include in particular solutions of the crosslinkable polymer in water, in aqueous salt solutions, in particular in aqueous salt solutions having an osmolarity of from about 200 to 450 milliosmol in 1000 ml (unit: mOsm/l), preferably an osmolarity of from about 250 to 350 mOsm/l, in particular about 300 mOsm/l, or in mixtures of water or aqueous salt solutions with physiologically acceptable polar organic solvents, for example glycerol. Preference is given to solutions of the crosslinkable polymers in water alone.

The aqueous salt solutions are advantageously solutions of physiologically acceptable salts, such as buffer salts, for example phosphate salts, which are conventional in the area of contact-lens care, or isotonicizing agents, in particular alkali metal halides, for example sodium chloride, which are conventional in the area of contact-lens care, or solutions of mixtures thereof. An example of a particularly suitable salt solution is an artificial, preferably buffered tear fluid whose pH and osmolarity have been matched to natural tear fluid, for example an unbuffered, preferably buffered for example by phosphate buffer, sodium chloride solution whose osmolarity and pH conform to the osmolarity and pH of human tear fluid.

The above-defined, essentially aqueous solutions of the crosslinkable polymer are preferably pure solutions, ie. those which are free or essentially free from undesired constituents. Particular preference is given to solutions of the crosslinkable polymer in pure water or in an artificial tear fluid as described above.

The viscosity of the solution of the crosslinkable polymer in the essentially aqueous solution is unimportant over broad limits. However, it should preferably be a flowable solution which can be shaped without stresses.

The mean molecular weight of the crosslinkable polymer is likewise unimportant within broad limits. However, the crosslinkable polymer preferably has a molecular weight of from about 10,000 to about 200,000.

Suitable polymeric backbones, in addition to polyvinyl alcohol (PVA), are materials as have in some cases already been proposed as contact-lens materials, for example polymeric diols other than PVA, polymers comprising saccharides, polymers comprising vinylpyrrolidone, polymers comprising alkyl (meth)acrylates, polymers comprising alkyl (meth)acrylates which are substituted by hydrophilic groups, such as hydroxyl, carboxyl or amino groups, polyalkylene glycols, or copolymers or mixtures thereof.

The crosslinkable polymer (prepolymer) used in accordance with the invention comprises the units containing one or more different crosslinkable group(s) and, if desired, the units containing the further modifier(s), reactive dye radicals and photoinitiator radicals, etc, in a total amount of from about 0.5 to 80%, preferably from 1 to 50%, advantageously from 1 to 25%, in particular from 2 to 15%, particularly preferably from 2 to 10%, based on the number of functional groups in the starting polymer, for example hydroxyl groups in the polyvinyl alcohol.

Crosslinkable polymers (prepolymers) which can be crosslinked in accordance with the invention and are intended for the production of contact lenses comprise, in particular, from about 0.5 to about 25%, especially from about 1 to 15%, particularly preferably from about 2 to 12%, of these units.

As already mentioned, for a crosslinkable polymer to be suitable in the novel process, it is essential that it is a crosslinkable polymer. However, the crosslinkable polymer is uncrosslinked or at least essentially uncrosslinked so that it is water-soluble.

Furthermore, the crosslinkable polymer is advantageously stable in the uncrosslinked state, so that it can be subjected to purification, as described above in connection with compounds comprising units of the formulae XI and XIII or XIII. The crosslinkable polymers are preferably employed in the novel process in the form of pure solutions. The crosslinkable polymers can be converted into the form of pure solutions as described below, for example.

The crosslinkable polymers used in the novel process can preferably be purified in a manner known per se, for example by precipitation with organic solvents, such as acetone, filtration and washing, extraction in a suitable solvent, dialysis or ultrafiltration, particular preference being given to ultrafiltration. This purification operation allows the crosslinkable polymers to be obtained in extremely pure form, for example as concentrated aqueous solutions, which are referred to hereinafter as pure or essentially pure. This term is understood to refer to a crosslinkable polymer or to a solution thereof which is free or at least substantially free from undesired constituents.

Undesired constituents in this context are generally all constituents which are physiologically undesired, especially monomeric, oligomeric or polymeric starting compounds used for the preparation of the water-soluble, crosslinkable polymer, or byproducts formed during the preparation of the water-soluble, crosslinkable polymer. Preferred degrees of purity of these constituents are less than 0.01%, in particular less than 0.001%, very particularly preferably less than 0.0001% (1 ppm). It is to be noted, however, that there may be present in the solution, for example by formation as byproducts during the preparation of the water-soluble, crosslinkable polymer, constituents which are not undesired from a physiological point of view, such as for example sodium chloride. Preferred degrees of purity of these constituents are less than 1%, in particular less than 0.1%, very particularly preferably less than 0.01%. In most cases such levels of constituents may be obtained by applying 3 to 4 repeated ultrafiltration cycles.

The preferred process for the purification of the crosslinkable polymers used in the novel process, namely ultrafiltration, can be carried out in a manner known per se. The ultrafiltration can be carried out repeatedly, for example from two to ten times. Alternatively, the ultrafiltration can also be carried out continuously until the desired degree of purity has been achieved. The desired degree of purity can in principle be chosen to be as great as desired.

In a preferred embodiment of the novel process, an essentially aqueous solution of the crosslinkable polymer which is essentially free from undesired constituents, for example free from monomeric, oligomeric or polymeric starting compounds used for the preparation of the crosslinkable polymer, and/or free from by-products formed during the preparation of the crosslinkable polymer, is prepared in step a) and used further. This essentially aqueous solution is particularly preferably a purely aqueous solution or a solution in an artificial tear fluid as described above. It is furthermore preferred for the novel process to be carried out without addition of a comonomer, for example a vinylic comonomer.

Owing to the abovementioned measures and in particular owing to a combination of said measures, the novel process is carried out using a solution of the crosslinkable polymer containing no or essentially no undesired constituents requiring extraction after crosslinking. It is therefore a particular feature of this preferred embodiment of the novel process that extraction of undesired constituents is not necessary after the crosslinking.

The novel process is therefore preferably carried out in such a way that the essentially aqueous solution of the crosslinkable polymer is free or essentially free from undesired constituents, in particular from monomeric, oligomeric or polymeric starting compounds used for the preparation of the crosslinkable polymer, or from by-products formed during the preparation of the crosslinkable polymer, and/or that the solution is used without addition of a comonomer.

An addition which may be added to the solution of the crosslinkable polymer is a photoinitiator for the crosslinking so long as an initiator is necessary for crosslinking of the crosslinkable groups. This may be the case, in particular, if the crosslinking takes place by photocrosslinking, which is preferred in the novel process.

In the case of photocrosslinking, it is expedient to add an initiator which is capable of initiating free-radical crosslinking and is readily soluble in water. Examples thereof are known to the person skilled in the art; suitable photoinitiators which may be mentioned specifically are benzoins, such as benzoin, benzoin ethers, such as benzoin methyl ether, benzoin ethyl ether, benzoin isopropyl ether and benzoin phenyl ether, and benzoin acetate; acetophenones, such as acetophenone, 2,2-dimethoxyacetophenone and 1,1-dichloroacetophenone; benzil, benzil ketals, such as benzil dimethyl ketal and benzil diethyl ketal, anthraquinones, such as 2-methylanthraquinone, 2-ethylanthraquinone, 2-tert-butylanthraquinone, 1-chloroanthraquinone and 2-amylanthraquinone; furthermore triphenylphosphine, benzoylphosphine oxides, for example 2,4,6-trimethylbenzoyl-diphenylphosphine oxide, benzophenones, such as benzophenone and 4,4'-bis (N,N'-dimethylamino) benzophenone; thioxanthones and xanthones; acridine derivatives; phenazine derivatives; quinoxaline derivatives and 1-phenyl-1,2-propanedione 2-O-benzoyl oxime; 1-aminophenyl ketones and 1-hydroxyphenyl ketones, such as 1-hydroxycyclohexylphenyl ketone, phenyl 1-hydroxyisopropyl ketone, 4-isopropylphenyl 1-hydroxyisopropyl ketone, 2-hydroxy-1-[4-(2-hydroxyethoxy)phenyl]-2-methylpropan-1-one, 1-phenyl-2-hydroxy-2-methylpropan-1-one, and 2,2-dimethoxy-1,2-diphenylethanone, all of which are known compounds.

Particularly suitable photoinitiators, which are usually used in combination with UV lamps as light source, are acetophenones, such as 2,2-dialkoxybenzophenones and hydroxyphenyl ketones, for example 2-hydroxy-1-[4-(2-hydroxyethoxy)phenyl]-2-methylpropan-1-one and 1-phenyl-2-hydroxy-2-methylpropan-1-one.

Another class of photoinitiators usually employed when argon ion lasers are used are benzil ketals, for example benzil dimethyl ketal.

The initiator used is preferably the initiator known under the name IRGACURE® 2959.

The photoinitiators are added in effective amounts, expediently in amounts of from about 0.1–2% by weight, in particular from 0.3 to 0.5% by weight, based on the total amount of the crosslinkable polymer.

The resultant solution can be introduced into a mould using methods known per se, such as, in particular, conventional metering, for example dropwise. The novel contact lenses can be produced in a manner known per se, for example in a conventional spin-casting mould, as described, for example, in U.S. Pat. No. 3,408,429, or by the full-mould process in a static mould, as described, for example, in U.S. Pat. No. 4,347,198. Appropriate moulds are made, for example, of polypropylene. Examples of suitable materials for reusable moulds are quartz and sapphire glass.

The crosslinkable polymers which are suitable in accordance with the invention can be crosslinked by irradiation with ionizing or actinic radiation, for example electron beams, X-rays, UV or VIS light, ie. electromagnetic radiation or particle radiation having a wavelength in the range from about 280 to 650 nm. He/Cd, argon ion or nitrogen or metal vapour or NdYAG laser beams with multiplied frequency are particularly suitable. It is known to the person skilled in the art that each selected light source requires selection and, if necessary, sensitization of the suitable photoinitiator. It has been recognized that in most cases the depth of penetration of the radiation into the crosslinkable polymer and the rate are in direct correlation with the absorption coefficient and concentration of the photoinitiator.

The crosslinking can also be initiated thermally if desired.

It should be emphasized that the crosslinking can take place in a very short time in accordance with the invention, for example in less than five minutes, preferably in less than one minute, in particular in up to 30 seconds, even in 3–30 seconds.

Apart from water, which is preferred, the crosslinking medium can additionally be any medium in which the crosslinkable polymer is soluble. In the case of polyvinyl alcohol as the polymer backbone, all solvents which dissolve polyvinyl alcohol are suitable, such as alcohols, for example ethanol, glycols, glycerol, piperazine (at elevated temperature), diamines, such as triethylenediamine, formamide, dimethylformamide, hexamethylphosphoric triamide, dimethyl sulfoxide, pyridine, nitromethane, acetonitrile, nitrobenzene, chlorobenzene, trichloromethane, dioxane and aqueous solutions of tetraalkylammonium bromide and iodide.

The opening of the mould so that the moulding can be removed can be carried out in a manner known per se. Whereas the process proposed in the prior art (U.S. Pat. No. 3,408,429 and 4,347,198) requires subsequent purification steps at this point, for example by extraction, and also steps for hydration of the resultant mouldings, in particular contact lenses, such steps are unnecessary in the novel process.

Since the solution of the crosslinkable polymer preferably comprises no undesired low-molecular-weight constituents, the crosslinked product also comprises no such constituents. Subsequent extraction is therefore unnecessary. Since the crosslinking is carried out in an essentially aqueous solution, subsequent hydration is unnecessary. These two advantages mean, inter alia, that complex subsequent treatment of the resultant mouldings, in particular contact lenses, is unnecessary. The contact lenses obtainable by the novel process are therefore distinguished, in an advantageous embodiment, by the fact that they are suitable for their intended use without extraction. The term 'intended use' in this connection is taken to mean, in particular, that the contact lenses can be employed in the human eye. The contact lenses obtainable by the novel process are furthermore distinguished in an advantageous embodiment by the fact that they are suitable for their intended use without hydration.

The novel process therefore proves to be extremely suitable for the efficient production of a large number of mouldings, such as contact lenses, in a short time. The contact lenses obtainable by this process have, inter alia, the advantages over the contact lenses known from the prior art that they can be used as intended without subsequent treatment steps, such as extraction or hydration.

The examples below serve to further illustrate the invention. In the examples, unless expressly stated otherwise, amounts are by weight and temperatures are given in degrees Celsius. Examples are not intended to represent any restriction of the invention, for example to the scope of the examples.

EXAMPLE 1

263.0 g (1.622 mol) of 1,1'-carbonyldiimidazole and 1.5 l of tetrahydrofuran are introduced into a 2.5 l glass apparatus which has been flushed with nitrogen gas and is fitted with stirrer, thermometer, reflux condenser and dropping funnel. 250.0 g (1.59 mol) of 3-(2-oxopyrrolidin-1-yl) propionic acid are introduced in portions into this suspension with stirring over the course of 10 minutes at an internal temperature of 19°–24° C., the carbon dioxide gas formed being discharged via the condenser. The reaction temperature is then raised to 38° C. over the course of 20 minutes, and 170.5 g (1.622 mol) of 2-aminoacetaldehyde dimethyl acetal are added dropwise over the course of 20 minutes at a reaction temperature of 38°–53° C. The reaction is allowed to continue at the boiling point for a further 1 hour and 35 minutes, the solvent is distilled off in a rotary evaporator, and the residue is dried at 110° C./0.1 mbar. The residue is dissolved in 400 ml of toluene, the solution is cooled to −25° C., the imidazole which crystallizes out is removed by filtration, the filtrate is evaporated in a rotary evaporator, and the residue is dried at 120° C./0.1 mmHg. The crude product is dissolved in 400 ml of a mixture of methylene chloride, ethanol and triethylamine (ratio 90:9:1) and purified over a chromatography column packed with 3.5 kg of silica gel 60 from E. Merck. The appropriate fractions are combined, and the solution is evaporated at 80° C. in a rotary evaporator, and the resultant product is dried at 90° C./0.1 mbar, giving 356.8 g (91.8% of theory) of a liquid N-(2,2-dimethoxyethyl)-3-(2-oxopyrrolidin-1-yl)propionamide having the following analytical data:

Elemental analysis:

|  | calculated | found |
| --- | --- | --- |
| % C | 54.08 | 53.89 |
| % H | 8.25 | 8.31 |
| % N | 11.47 | 11.53 |

Acetal content: 24.2% of $OCH_3$ (theory: 25.4%)

Structure:

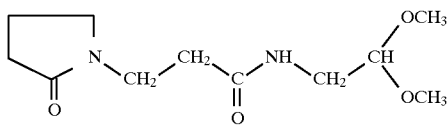

EXAMPLE 2

Analogously to Example 1, 165.43 g (1.02 mol) of 1,1'-carbonyldiimidazole and 700 ml of tetrahydrofuran are introduced into an apparatus, allowed to react with 202.86 g (1.0 mol) of 3-(4,4-dimethyl-2,5-dioxoimidazolidin-1-yl) propionic acid and subsequently reacted with 107.21 g (1.02 mol) of 2-aminoacetaldehyde dimethyl acetal. The reaction mixture is evaporated to dryness at 80° C./0.1 mbar in a rotary evaporator, and the resultant residue is purified analogously to Example 1, giving 154.2 g (54.2% of theory) of N-(2,2-dimethoxyethyl)-3-(4,4-dimethyl-2,5-dioxoimidazolidin-1-yl)propionamide, which melts at 123° C.

Elemental analysis

|     | calculated | found |
| --- | --- | --- |
| % C | 50.16 | 50.43 |
| % H | 7.37 | 7.40 |
| % N | 14.43 | 14.61 |

Acetal content: 21.22% of OCH$_3$ (theory: 21.60%)
Structure:

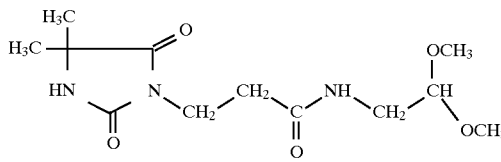

EXAMPLE 3

82.7 g (0.51 mol) of 1,1'-carbonyldiimidazole in 5.0 l of tetrahydrofuran are allowed to react as described in Example 1, with 93.08 g (0.5 mol) of 3-(3,5,5-trimethyl-2,4-dioxoimidazolidin-1-yl)propionic acid and are subsequently reacted with 53.62 g (0.51 mol) of 2-aminoacetaldehyde dimethyl acetal. The reaction mixture is evaporated in a rotary evaporator, and the imidazole present in the residue is removed by distillation at a bath temperature of 120° C./0.1 mmHg for 3 hours, giving 134.1 g (98.1% of theory) of a brownish, liquid crude product, which is recrystallized from 130 ml of ethyl acetate, giving 88.1 g (65.0% of theory) of colourless, crystalline N-(2,2-di methoxyethyl)-3-(3,5,5-trimethyl-2,4-dioxoimidazolidin-1-yl)propionamide, whose melting point is 86.4° C.

Elemental analysis

|     | calculated | found |
| --- | --- | --- |
| % C | 48.34 | 48.61 |
| % H | 7.01 | 7.08 |
| % N | 15.38 | 15.65 |

Acetal content: 21.69% of OCH$_3$ (theory: 22.71%)

Structure:

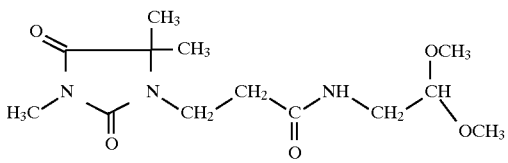

EXAMPLE 4

85.46 g (0.667 mol) of 5,5-dimethylhydantoin, 110.6 g (0.80 mol) of anhydrous potassium carbonate and 124.0 g (0.7336 mol) of 2-bromoacetaldehyde dimethyl acetal in 600 ml of dimethylformamide are reacted for about 6 hours analogously to Example 1 in a glass apparatus. The reaction mixture is subsequently cooled to room temperature and filtered with suction, the filtrate is evaporated in a rotary evaporator, and the residue is dried at 110° C./0.1 mbar. The crude yield is 143.2 g (99.3% of theory) of 3-(2,2-dimethoxyethyl)-5,5-dimethylimidazolidine-2,4-dione. 21 g of the crude product are dissolved in 50 ml of 0.1N sodium hydroxide solution at room temperature, and the solution is extracted 3 times by shaking with 30 ml of tert-butyl methyl ether in each case in a separating funnel. The organic phases are combined, the solution is dried using anhydrous sodium sulfate and subsequently filtered, the clear filtrate is evaporated in a rotary evaporator, and the residue is dried for 1 hour at 60° C./0.1 mbar, giving 12.3 g of pure, highly viscous 3-(2,2-dimethoxyethyl)-5,5-dimethylimidazolidine-2,4-dione having the following analytical data:

Elemental analysis

|     | calculated | found |
| --- | --- | --- |
| % C | 44.99 | 50.17 |
| % H | 7.46 | 7.44 |
| % N | 12.96 | 13.00 |

Structure:

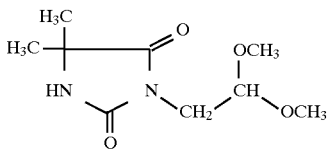

EXAMPLE 5

87.0 g (0.762 mol) of 1-methylhydantoin and 48.55 g (0.915 mol) of acrylonitrile are introduced into an apparatus at an internal temperature of 67° C., and 8 ml of 1 molar sodium hydroxide solution are added dropwise over the course of 12 minutes, during which an exothermic reaction occurs and the temperature rises to 75° C. The reaction mixture is then stirred for 1 hour and 48 minutes at 75° C.–103° C. and then neutralized with 0.92 g of 32% hydrochloric acid. The reaction product is purified by vacuum distillation, giving 94.7 g (74.3% of theory) of crystalline 3-(3-methyl-2,4-dioxoimidazolidin-1-yl)propionitrile, whose melting point is 53° C.

Elemental analysis

|      | calculated | found |
|------|------------|-------|
| % C  | 50.29      | 50.21 |
| % H  | 5.43       | 5.49  |
| % N  | 25.14      | 25.04 |

Structure:

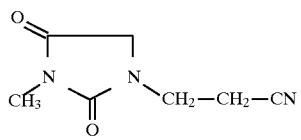

EXAMPLE 6

334.33 g (2.0 mol) of 3-(3-methyl-2,4-dioxoimidazolidin-1-yl)propionitrile, prepared as described in Example 5, are hydrolysed for 5 hours and 30 minutes at 96°–107° C. in a mixture of 1482.7 g (13.0 mol) of aqueous 32% hydrochloric acid and 288.3 g (4.8 mol) of acetic acid. The reaction solution is then evaporated at 90° C. under reduced pressure in a rotary evaporator and dried at 120° C./0.1 mbar to constant weight, giving 354.1 g (95.1% of theory) of crude product, which is purified by recrystallization from 1 liter of ethyl acetate, giving 184 g (50.4% of theory) of crystalline 3-(3-methyl-2,4-dioxoimidazolidin-1-yl)propionic acid having a melting point of 109° C.

Elemental analysis

|      | calculated | found |
|------|------------|-------|
| % C  | 45.16      | 45.43 |
| % H  | 5.41       | 5.454 |
| % N  | 15.05      | 14.80 |

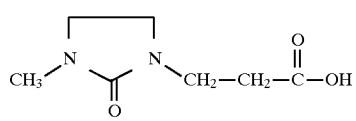

EXAMPLE 7

340.9 g (2.6857 mol) of oxalyl chloride are added dropwise over the course of 18 minutes at an internal temperature of 19°–23° C. to a solution of 100.0 g (0.537 mol) of 3-(3-methyl-2,4-dioxoimidazolidin-1-yl)propionic acid, synthesized as described in Example 6, 350 ml of methylene chloride and 1 ml of dimethyl formamide, and the mixture is subsequently stirred at room temperature for 5 hours and 10 minutes. When the reaction is complete, the reaction mixture is evaporated in a rotary evaporator, the residue is stripped 3 times at 50° C. under reduced pressure with 100 ml of toluene in each case, and the residue is dried at 60° C./0.1 mbar to constant weight, giving 106.1 g (97.3% of theory) of solid, brownish 3-(3-methyl-2,4-dioxoimidazolidin-1-yl)propionyl chloride having the following analytical data:

Elemental analysis

|      | calculated | found |
|------|------------|-------|
| % C  | 41.09      | 41.44 |
| % H  | 4.43       | 4.51  |
| % N  | 13.69      | 13.58 |
| % Cl | 17.33      | 16.96 |

Structure:

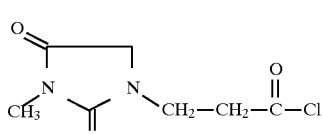

EXAMPLE 8

123.0 g (0.6012 mol) of 3-(3-methyl-2,4-dioxoimidazolidin-1-yl)propionyl chloride from Example 7 are dissolved in 1 liter of toluene at 78° C., and 90.03 g (0.7815 mol) of trimethylsilyl azide are added dropwise to the solution over the course of 30 minutes. The reaction mixture is then stirred at 84° C. for 2 hours and subsequently evaporated at 90° C. under reduced pressure in a rotary evaporator, and the residue is dried at 100° C./0.1 mbar, giving 109.4 g (99.3% of theory) of 1-(2-isocyanatoethyl)-3-methylimidazolidine-2,4-dione, which is purified by fractional distillation and boils at 97°–98° C./0.05 mbar, giving 39.5 g (35.8% of theory) of a clear, colourless distillate having an isocyanate content of 5.38 meq of NCO/g (98.5% of theory).

Elemental analysis

|      | calculated | found |
|------|------------|-------|
| % C  | 45.90      | 46.05 |
| % H  | 4.95       | 4.97  |
| % N  | 22.94      | 22.96 |

Structure:

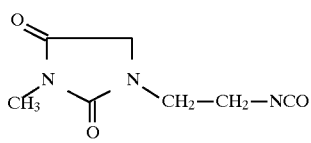

EXAMPLE 9

1800 g of Mowiol 6-98 (polyvinyl alcohol from Hoechst AG) are dissolved in 5 liters of demineralized water at an internal temperature of 80° C. in a glass reactor with ground glass joints fitted with stirrer, thermometer and dropping funnel, 720 g (7.308 mol) of 37% hydrochloric acid are then added over the course of 15 minutes at an internal temperature of 33°–34° C., and 491.6 g (2.0124 mol) of N-(2,2-dimethoxyethyl)-3-(2-oxopyrrolidin-1-yl)propionamide (prepared as described in Example 1) are then added dropwise over the course of 1 hour. The reaction mixture is stirred at 27°–33° C. for 24 hours and subsequently neutralized using 740 g (7.308 mol) of triethylamine, and the dissolved polymer is precipitated using 100 liters of ethanol in an Ultra-Turax online Dispax reactor from Janke &

Kunkel GmbH & Co. The suspension is filtered with suction, and the filter residue is washed with ethanol and acetone and dried at 60° C. under reduced pressure, giving 1781 g of a colourless, pulverulent polymer:

Analytical data:
Nitrogen content: 2.52%
OH group: 14.68 meq/g
Water content: 2.32% (by the Karl Fischer method)
Structure:

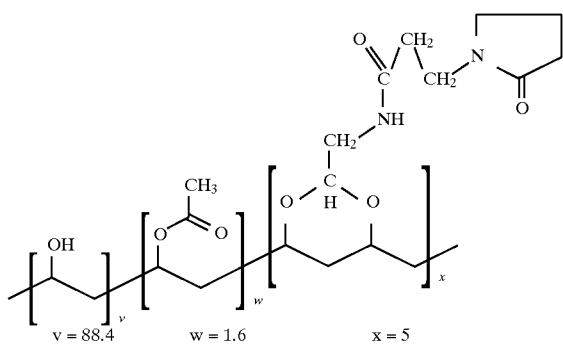

EXAMPLE 10

9.52 g (61.41 mmol) of 2-isocyanatoethyl methacrylate dissolved in 30 ml of anhydrous dimethyl sulfoxide are added dropwise over the course of 15 minutes at an internal temperature of 80° C. to a solution of 50 g of the polymer (prepared as described in Example 9), 0.2 g of hydroquinone monomethyl ether, 0.04 g of N,N-dimethylcyclohexylamine and 360 ml of anhydrous dimethyl sulfoxide in a 750 ml flask with ground glass joints equipped as described in Example 9, and the reaction mixture is stirred at 80° C. for 5 hours. When the reaction is complete, the polymer solution is precipitated in 4 liters of acetone with vigorous stirring by means of a guide beam stirrer, the resultant suspension is filtered with suction, and the filter residue is washed with acetone and dried at 50° C. under reduced pressure, giving 52.2 g of a pulverulent, colourless polymer having the following analytical data:

Nitrogen content: 3.02% N

OH group: 14.08 meq/g

Double bond: 0.62 mmol of $H_2$/g

Structure:

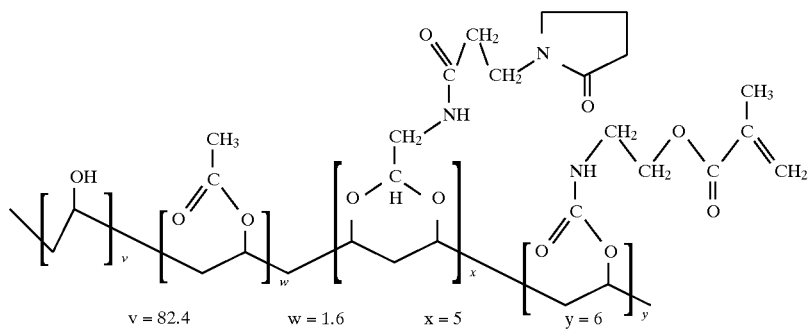

EXAMPLE 11

As described in Example 10, 150 g of polymer prepared as described in Example 9 are dissolved in 1 liter of anhydrous dimethyl sulfoxide, 0.5 g of hydroquinone monomethyl ether and 0.15 g of N,N-dimethylcyclohexylamine are added, and the polymer solution is subsequently reacted, as described in Example 10, with a solution of 28.58 g of 2-isocyanatoethyl methacrylate and 100 ml of anhydrous dimethyl sulfoxide. Work-up is carried out as described in Example 10, giving 154.9 g of a colourless polymer. A solution of 150 g of the polymer described above and 2850 ml of bidistilled water is subjected to ultrafiltration (5 KD membrane; 0.23 $m^2$). The purified polymer solution is precipitated in 10 liters of acetone and filtered with suction, the resultant moist residue is mixed vigorously into 10 liters of acetone, the resultant suspension is filtered with suction, and the filter cake dried under reduced pressure at 50° C., giving 136.7 g (91.1% of the amount employed) of a colourless, pure polymer having the following analytical data:

Nitrogen content: 3.17%
OH group: 13.12 meq/g
Double bond: 0.71 meq of $H_2$/g
Water content: 2.37% (by the Karl Fischer method)
Structure:

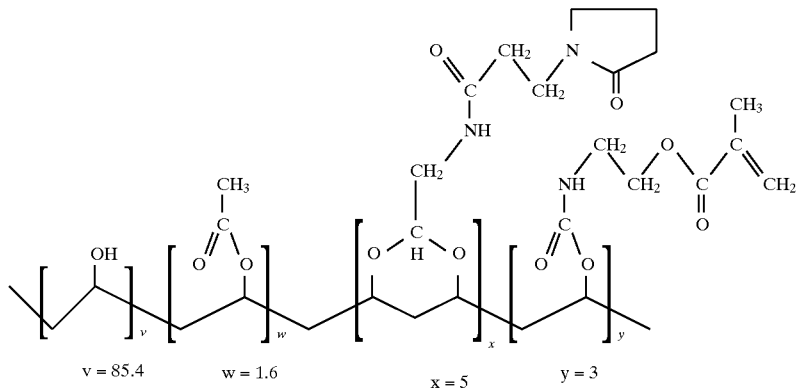

v = 85.4   w = 1.6   x = 5   y = 3

EXAMPLE 12

A mixture of 5.72 g (36.89 mmol) of 2-isocyanatoethyl methacrylate and 11.26 g (61.48 mmol) of 1-(2-isocyanatoethyl)-3-methylimidazolidine-2,4-dione (prepared as described in Example 8) in 30 ml of anhydrous dimethyl sulfoxide are added dropwise over the course of 25 minutes with stirring at an internal temperature of 80° C. to a solution of 50.0 g of Mowiol 6-98 (polyvinyl alcohol from Hoechst AG), 350 g of anhydrous dimethyl sulfoxide, 0.4 g of hydroquinone monomethyl ether and 0.028 g of N,N-dimethylcyclohexylamine in a glass apparatus as described in Example 9. The mixture is allowed to react for a further 5 hours at an internal temperature of 80° C., the solution is diluted with 100 ml of acetone, and the polymer is precipitated in 4 liters of acetone. The suspension is filtered with suction, and the filter residue is washed with acetone, sucked dry and dried at 50° C. to constant weight, giving 60.9 g of the desired polymer, which has the following analytical data:

Nitrogen content: 4.263% N

OH group: 13.96 meq of OH/g

Double bond: 0.45 meq of C=C/g

Water content: 2.95% (by the Karl Fischer method)

Structure:

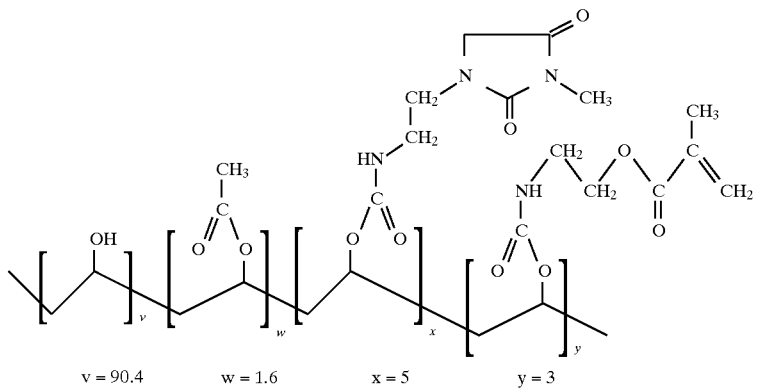

v = 90.4   w = 1.6   x = 5   y = 3

EXAMPLE 13

63.6 g of Mowiol 10-98 (polyvinyl alcohol from Hoechst AG), 0.5 g of hydroquinone monomethyl ether and 1.5 g of dibutyltin dilaurate, dissolved in 430 ml of anhydrous DMSO, are allowed to react with a mixture of 7.28 g (46.9 mmol) of 2-isocyanatoethyl methacrylate and 3.33 g (46.9 mmol) of ethyl isocyanate in 20 ml of anhydrous DMSO at 80° C. for 5 hours as described in Example 12, and, when the reaction is complete, the product is worked up as described in Example 12, giving 68.9 g of the desired polymer having the following analytical data:

Nitrogen content: 1.724% N

OH group: 17.08 meq of OH/g

Double bond: 0.62 meq of C=C/g

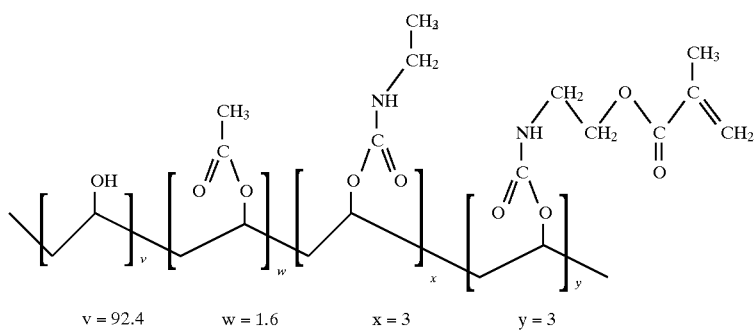

v = 92.4  w = 1.6  x = 3  y = 3

EXAMPLE 14

13.24 g (116 mmol) 1-methylhydantoin, 19.34 g (140 mmol) waterfree potassium carbonate and 29.2 g (3-bromo-propionaldehyd-dimethylacetal are allowed to react in 90 ml dimethylsulfoxid for 3 hours and 25 minutes at 112°–115° C. The reaction mixture is subsequently cooled to 5° C. and filtered with suction. The filtrate is evaporated in a rotary evaporator and the liquid crude product is purified by fractional distillation in vacuo to give 12.44 g (49.6% of theory) liquid 3-(3,3-dimethoxy-propyl)-1-methyl-imidazolidin-2,4-dione, having a boiling point of 112°–114° C./0.07 mbar.

Elemental analysis:

|     | calculated | found |
| --- | --- | --- |
| % C | 49.99 | 50.14 |
| % H | 7.46 | 7.53 |
| % H | 12.96 | 13.10 |

Acetal content: 28.535% O—CH$_3$ (99.4% of theory)

Structur:

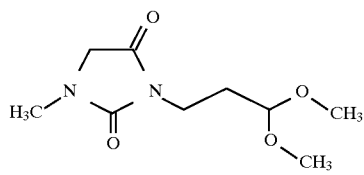

EXAMPLE 15

Analogously to example 1, 253.08 g (1.297 mol) 3-(3,5,5-trimethyl-2,4-dioxo-imidazolidin-1-yl)-propionic acid nitrile are hydrolyzed in a solution of 833.1 g 37% hydrochloric acid and 187.8 g acetic acid and worked up. The crude product (mixture of acid and ammonium chloride) is heated in 750 ml toluene until boiling, filtered while hot, and the clear filtrate is cooled to 5° C. The crystallized acid is isolated and dried at 80°/30 mbar. 249.7 g (91.2% of theory) crystalline 3-(3,5,5-trimethyl-2,4-dioxo-imidazolidin-1-yl)-propionic acid are obtained which melts at 103° C.

Elemental analysis

|     | calculated | found |
| --- | --- | --- |
| % C | 50.46 | 50.51 |
| % H | 6.59 | 6.67 |
| % N | 13.08 | 13.10 |

Structur:

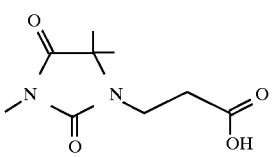

EXAMPLE 16

A mixture of 10.71 g (50 mmol) 3-(3,5,5-trimethyl-2,4-dioxo-imidazolidin-1yl)-propionic acid (synthetized according to example 15), 31.73 g oxalyl chloride, 25 ml methylenechloride and 0.5 ml dimethylformamide is stirred for 1 h and 55 minutes at 24° C., thereafter evaporated in a rotary evaporator at 70° C. in vacuo, stripped 3 times with about 50 ml of toluene, evaporated completely do dryness and dried at 70° C./10.1 mbar. 11.36 g (97.6% of theory) of crystalline 3-(3,5,5-trimethyl-2,4-dioxo-imidazolidin-1yl)-propionylchloride are obtained.

Elemental analysis

|     | calculated | found |
| --- | --- | --- |
| % C | 46.46 | 46.86 |
| % H | 5.63 | 5.85 |
| % N | 12.04 | 11.98 |
| % Cl | 15.24 | 15.19 |

Structure:

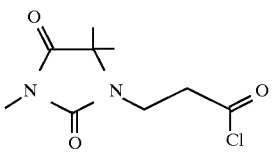

EXAMPLE 17

19.61 g (84.3 mmol) 3-(3,5,5-trimethyl-2,4-dioxo-imidazolidin-1-yl)-propionylchloride (synthesized according to example 16) and 12.68 g (110 mmol) trimethylsilylazide are allowed to react in 60 ml toluene for 4 hours and 10 minutes at 88°–95° C. Subsequently the reaction mixture is evaporated and the crude product is purified by fractional distillation. 7.98 g (55.9% of theory) of crystalline 1-(2-isocyanato-ethyl)-3,5,5-trimethyl-imidazolidin-2,4-dione are obtained which melts at 62° C.

Elemental analysis

|     | calculated | found |
|-----|------------|-------|
| % C | 51.18      | 51.34 |
| % H | 6.20       | 6.31  |
| % N | 19.89      | 19.76 |

Isocyanate content: 4.55 milli-equivalents NCO/g

Structur:

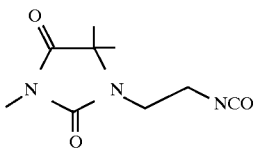

EXAMPLE 18

To a solution of 37.24 g Mowiol 6-98 (polyvinyl alcohol from Hoechst AG), 20 ml 2N hydrochloric acid (40 mmol) and 140 ml water, there is added dropwise, within 10 minutes at 39° C. inner temperature, a solution of 9.0 g (41.6 mmol) 3-(3,3-dimethoxy-propyl)-1-methyl-imidazolidin-2, 4-dione (synthesized according to example 14) and 20 ml water and allowed to react for 22 hours and 30 minutes. Then 4.05 g (40 mmol) triethylamine are added for neutralisation, the reaction mixture is precipitated in 2 liters of ethanol and isolated by filtration. The moist filter residue is mixed with 2 liters of ethanol, filtered with suction, which process is repeated with 2 liters of ethanol and 2 liters of aceton. The filter residue is dried at 60° C. in vacuo, and 40.3 g of the desired polymer are obtained.

Analytical data:

Nitrogen content: 2.63% N

OH-content: 17.35 milli-equivalents OH/g

Water content: 1.51% $H_2O$

Structure:

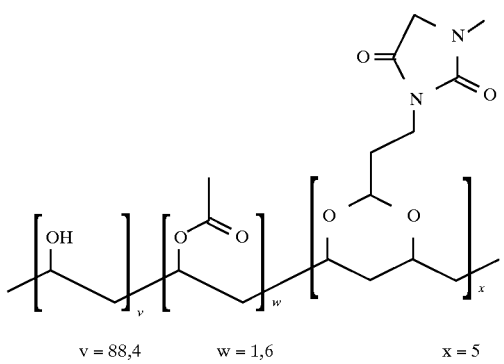

v = 88,4     w = 1,6     x = 5

EXAMPLE 19

30.0 g Polymer (synthesized according to example 18), 0.1 g triethylamine and 0.2 g hydrochinon-monomethylether are dissolved in 170 ml dimethylsulfoxide, heated to 80° C., and within 10 minutes a solution of 3.57 g (23 mmol) 2-isocyanatoethyl-methacrylate and 10 ml dimethylsulfoxide is added dropwise. This mixture is allowed to react 5 hours at 80° C., the mixture is then processed according to example 18. 30.9 g of a colourless pulverulent polymer are obtained having the following analytical data:

Nitrogen content: 3.22% N

Double Bonds: 0.66 meq C=C/g

OH-Groups: 14.36 milli-equivalents OH/g

Structure:

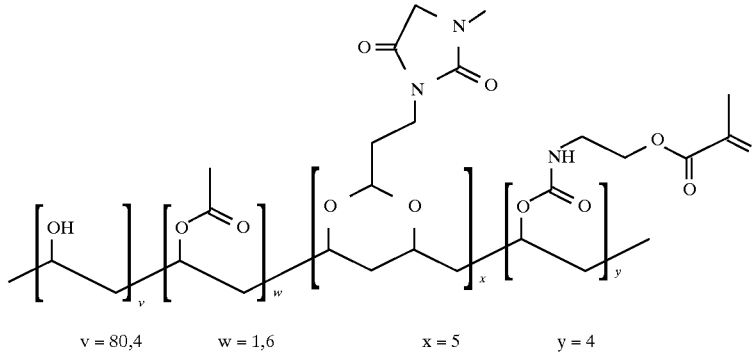

v = 80,4     w = 1,6     x = 5     y = 4

EXAMPLE 20

Analogously to example 9 a solution of 50.53 g (167.7 mmol) N-(2,2-dimethoxy-ethyl)-3-(3,5,5-trimethyl-2,4-dioxo-imidazolidin-1-yl)-propionic acid amide and 21.34 g (134.1 mmol) 2-acrylamido-acetaldehyd-dimethylacetal in 150 ml water are added dropwise within 15 minutes to 150 g Mowiol 6-98 (polyvinyl alcohol from Hoechst AG), dissolved in 550 ml water and 120 ml 2N hydrochloric acid, and allowed to react at 40° C. for 5 hours. The reaction mixture is then neutralized with 120 ml 2N NaOH, the neutralized solution is filtered and the clear filtrate is purified by ultrafiltration. The purified aqueous polymer solution is introduced into 15 liters of aceton while vigorously stirring with a stirrer (a so called "Leitstrahlrührer"), the precipitated polymer is isolated by filtration and the filter residue is dried under vacuum at 50° C. 182.3 g of a colourless polymer are obtained having the following analytical data:

Nitrogen content: 3.57% N
Water content: 2.84% $H_2O$
Double bonds: 0.63 milli-equivalents/g
OH-Groups: 14.52 milli-equivalents/g
Structur:

exposed for 6 seconds to a 200 W Oriel UV lamp (150 mW/cm$^2$) in a transparent polypropylene contact lens mould. The lenses are removed from the mould. They are transparent and have very good wearing properties. They are particularly suitable as single-day lenses, with the further advantage that in principle care solutions for contact lenses are unnecessary.

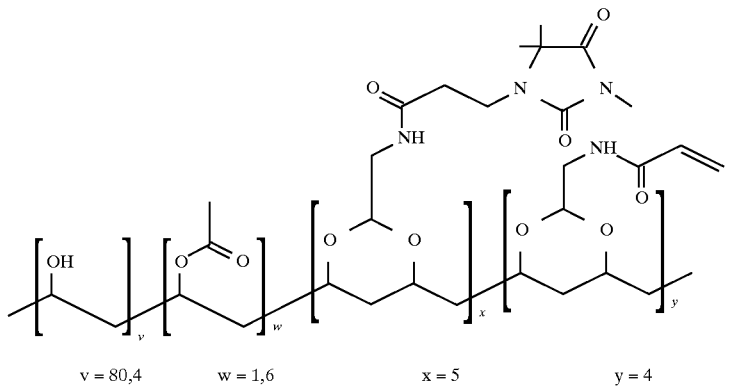

v = 80,4     w = 1,6     x = 5     y = 4

EXAMPLE 21

200 g Mowiol 6-98 (polyvinyl alcohol from Hoechst AG) are dissolved in 600 ml water, then 80 g (0.812 mol) hydrochloric acid 37% are added and finally 41.4 g (0.2236 mol) 1-(2,2-dimethoxy-ethyl)-pyrrol-2,5-dione are added within 15 minutes at 30° C. inner temperature. Then the reaction mixture is stirred 25 hours and 45 minutes at 29°–36° C., then neutralized with 82.17 g (0.812 mol) triethylamine, and the solution is transferred into 15 liters of ethanol with vigorous stirring. The precipitated polymer is isolated by filtration, the filter residue washed with ethanol and aceton and then dried at 50° C. in vacuo. 202.4 g of a pulverulent polymer are obtained which is then dissolved in 2.4 liters of water and further purified by ultrafiltration. The purified polymer solution is, as described above, precipitated in 10 liters of aceton, isolated and dried. 148.4 g of the desired polymer are obtained having the following analytical data:

Nitrogen content: 1.20% N
Double bonds: 0.76 milli-equivalents C=C/g
Water content: 2.68% $H_2O$
Structur

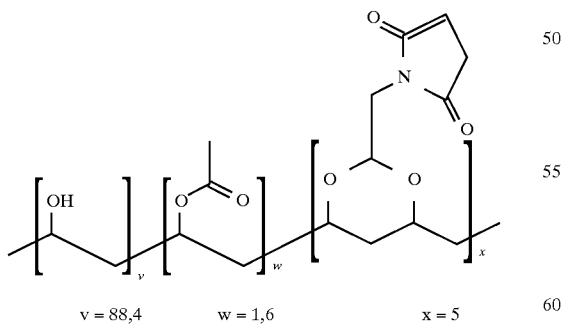

v = 88,4     w = 1,6     x = 5

EXAMPLE 22

Production of contact lenses 0.3% of Irgacure 2059 (based on the polymer content) is added to a 30% solution of the polymers mentioned in Examples 10 to 13. The solutions are

What is claimed is:

1. A process for production of mouldings, which comprises the following steps:

a) preparation of an essentially aqueous solution of a water-soluble crosslinkable polymer comprising crosslinkable units of the formula XI

and at least one further modifier comprising units of the formula XII

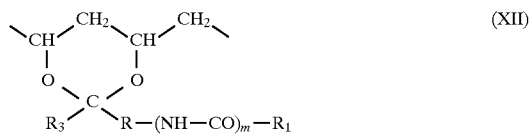

or units of the formula XIII

in which
U is an

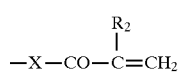

or —Y—NH—CO—O—Z—O—CH=$CH_2$ group,
X is a bridge having 2 to 12 carbon atoms,
$R_2$ is hydrogen or a $C_1$–$C_4$alkyl group, Y is a bridge having 7 to 12 carbon atoms, Z is a $C_2$–$C_{12}$alkylene bridge, which may be interrupted once or more than once by an oxygen atom, $R_3$ is hydrogen, a $C_1$–$C_6$alkyl group or a cycloalkyl group, R is a $C_1$–$C_{12}$alkylene bridge, $R_1$ is an organic group having 1 to 18 carbon atoms, A is an organic radical having 1 to 18 carbon atoms, and m is 0 or 1, b) introduction of the resultant solution into a mould, c) initiation of the crosslinking in water or in an organic solvent in which the crosslinkable polymer is dissolved, and d) opening of the mould so that the moulding can be removed.

2. A process according to claim 1, wherein the moulding is a contact lens.

3. A process according to claim 1, wherein the essentially aqueous solution of the water-soluble, crosslinkable polymer comprising crosslinkable units and at least one further modifier is free or essentially free from undesired constituents, including, monomeric, oligomeric or polymeric starting compounds used for the preparation of the water-soluble, crosslinkable polymer, or byproducts formed during the preparation of the water-soluble, crosslinkable polymer.

4. A process according to claim 1, wherein the essentially aqueous solution of the water-soluble, crosslinkable polymer comprising crosslinkable units and at least one further modifier is used without addition of a comonomer.

5. A process according to claim 1, wherein an initiator for the crosslinking is added to the solution of the water-soluble, crosslinkable polymer.

6. A process according to claim 1, wherein the crosslinking is not followed by extraction in order to remove undesired constituents.

7. A process according to claim 1, which comprises the following steps:

a) preparation of an essentially aqueous solution of a water-soluble, crosslinkable polymer comprising units of the formulae XI and XII or XIII which is free or essentially free from undesired constituents, including, monomeric, oligomeric or polymeric starting compounds used for the preparation of the polymer, or byproducts formed during the preparation of the polymer, and is used without addition of a comonomer, b) introduction of the resultant solution into a mould, c) initiation of the crosslinking, and d) opening of a mould so that the moulding can be removed.

8. A process according to claim 7, wherein the moulding is a contact lens.

9. A process for the production of a contact lens according to claim 8, wherein the essentially aqueous solution is a purely aqueous solution or a solution in an artificial tear fluid.

10. A process for the production of a contact lens according to claim 8, wherein a crosslinking initiator is added to the solution, and the crosslinking is carried out by photocrosslinking.

11. A contact lens, obtained by a process according to claim 1.

12. A contact lens according to claim 11, which is suitable for its intended use without extraction.

13. A contact lens obtained according to claim 8, which is suitable for its intended use without extraction.

14. A crosslinkable polymer comprising units of the formulae XI and XII, XI and XII or XI, XII and XIII

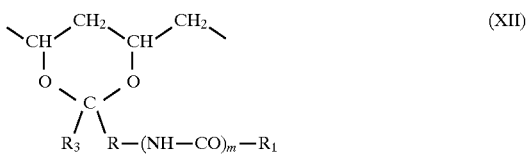

in which

U is an

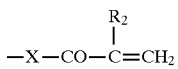

or —Y—NH—CO—O—Z—O—CH=$CH_2$ group,

X is a bridge having 2 to 12 carbon atoms, $R_2$ is hydrogen or a $C_1$–$C_4$alkyl group, Y is a bridge having 7 to 12 carbon atoms, Z is a $C_2$–$C_{12}$alkylene bridge, which may be interrupted once or more than once by an oxygen atom, $R_3$ is hydrogen, a $C_1$–$C_6$alkyl group or a cycloalkyl group, R is a $C_1$–$C_{12}$alkylene bridge, $R_1$ is an organic group having 1 to 18 carbon atoms, A is an organic radical having 1 to 18 carbon atoms, and m is 0 or 1.

15. A crosslinkable polymer according to claim 14, which is a derivative of a polyvinyl alcohol having a molecular weight of at least about 2000 comprising from about 0.5 to about 80%, based on the number of hydroxyl groups in the polyvinyl alcohol, of units of the formulae XI and XII, XI and XIII or XI, XII and XIII.

16. A crosslinkable polymer according to claim 15, which comprises units of the formula V

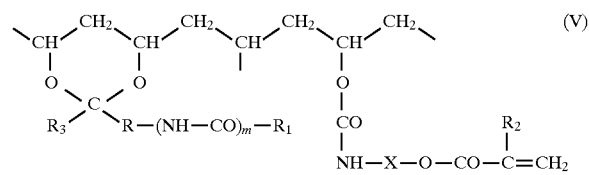

or of the formula VII

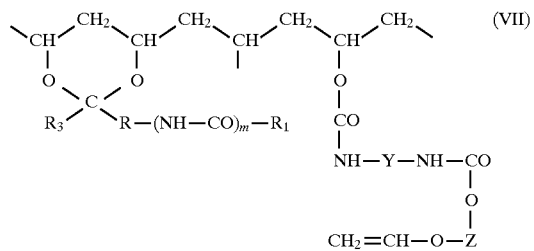

or of the formula IX

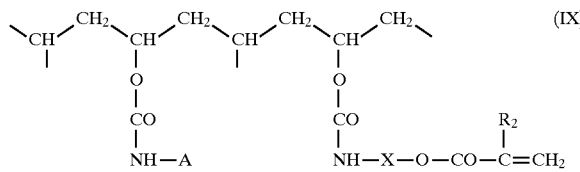

or of the formula X

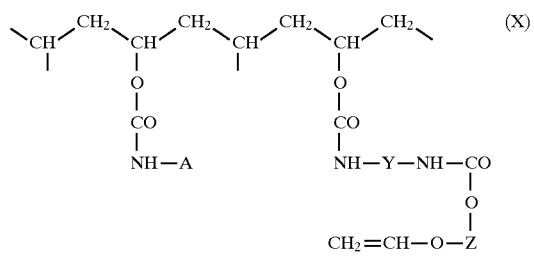

17. A crosslinkable polymer according to claim 16, which comprises units of the formula V or of the formula IX.

18. A crosslinkable polymer according to claim 16, which comprises units of the formula V, in which:

$R_3$ is hydrogen or a $CH_3$ or $C_2H_5$ group,

R is a $C_1$–$C_3$alkylene bridge, m is 0, $R_1$ is the radical of a heterocyclic compound, X is an aliphatic bridge having 2 to 12 carbon atoms, $R_2$ is hydrogen or $CH_3$.

19. A crosslinkable polymer according to claim 16, which comprises units of the formula VII, in which:

$R_3$ is hydrogen or a $CH_3$ or $C_2H_5$ group,

R is a $C_1$–$C_3$alkylene bridge, m is 0, $R_1$ is a radical of a heterocyclic compound, Y is a $C_7$–$C_{12}$aromatic radical, and Z is a $C_2$–$C_4$alkylene bridge.

20. A crosslinkable polymer according to claim 16, which comprises units of the formula IX, in which:

A is an aliphatic radical having 1 to 18 carbon atoms,

X is an aliphatic bridge having 2 to 12 carbon atoms, and $R_2$ is hydrogen or $CH_3$.

21. A crosslinkable polymer according to claim 20, in which A is $C_1$–$C_6$alkyl, above.

22. A crosslinkable polymer according to claim 16, which comprises units of the formula X, in which A is an aliphatic radical having 1 to 18 carbon atoms, Y is an aromatic radical having 7 to 12 carbon atoms, and Z is a $C_2$–$C_4$alkylene bridge.

23. A crosslinked polymer obtainable by photocrosslinking a crosslinkable polymer according to claim 14, in the presence or absence of an additional vinylic comonomer.

24. A crosslinked polymer obtained by photocrosslinking a crosslinkable polymer according to claim 14 in essentially pure form, in the presence or absence of an additional vinylic comonomer.

25. A crosslinked polymer according to claim 24, where the crosslinkable polymer is converted into essentially pure form by single or repeated ultrafiltration.

26. A crosslinked polymer obtainable by photocrosslinking a crosslinkable polymer according to claim 14 in the absence of an additional vinylic comonomer.

27. A crosslinked polymer obtained by photocrosslinking a crosslinkable polymer according to claim 14 in the presence of from 0.5 to 80 units of an additional vinylic comonomer per unit of formula XI.

28. A process for the preparation of a crosslinked polymer, which comprises photocrosslinking a crosslinkable polymer according to claim 14 in the presence or absence of an additional vinylic comonomer.

29. A process according to claim 28, wherein the crosslinkable polymer is employed in essentially pure form.

30. A process according to claim 29, wherein the crosslinkable polymer is converted into essentially pure form by single or repeated ultrafiltration.

31. A process according to claim 28, wherein the photocrosslinking is carried out in aqueous solution.

32. A process according to claim 28, wherein the photocrosslinking is carried out in an organic solution in which the crosslinkable polymer is dissolved.

33. A process according to claim 32, wherein the photocrosslinking is carried out in dimethyl sulfoxide.

34. A moulding comprising a crosslinked polymer according to claim 23.

35. A moulding according to claim 34, wherein the moulding is a contact lens.

36. A process for the production of a moulding, which comprises photocrosslinking a crosslinkable polymer according to claim 14 in a closed mould in the presence or absence of an additional vinylic comonomer.

37. A process for the production of a contact lens, which comprises photocrosslinking a crosslinkable polymer according to claim 14 in a closed contact-lens mould by the full-mould method in the presence or absence of an additional vinylic comonomer.

38. A process according to claim 4, wherein the essentially aqueous solution of the water-soluble, crosslinkable polymer comprising crosslinkable units and at least one further modifier is used without addition of a vinylic comonomer.

39. A crosslinkable polymer according to claim 19, wherein Y is

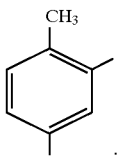

40. A crosslinkable polymer according to claim 20, wherein A is ethyl or isopropyl.

41. A crosslinkable polymer according to claim 22, wherein Y is

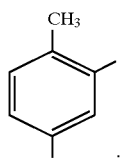
42. A crosslinked polymer according to claim 27, wherein the additional vinylic comonomer is present from 1 to 30 units.
43. A crosslinked polymer according to claim 27, wherein the additional vinylic comonomer is present from 5 to 20 units.
* * * * *